United States Patent
Broyde et al.

(10) Patent No.: US 7,167,019 B2
(45) Date of Patent: Jan. 23, 2007

(54) METHOD AND DEVICE FOR TRANSMISSION WITH REDUCED CROSSTALK

(75) Inventors: Frederic Broyde, Maule (FR); Evelyne Clavelier, Maule (FR)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 10/541,059

(22) PCT Filed: Dec. 24, 2003

(86) PCT No.: PCT/EP03/15036

§ 371 (c)(1),
(2), (4) Date: Jun. 29, 2005

(87) PCT Pub. No.: WO2004/062129

PCT Pub. Date: Jul. 22, 2004

(65) Prior Publication Data

US 2006/0099926 A1   May 11, 2006

(30) Foreign Application Priority Data

Jan. 6, 2003   (FR) .................................. 03 00064

(51) Int. Cl.
*H03K 17/16* (2006.01)
*H04B 3/28* (2006.01)
*G09G 3/20* (2006.01)
*H01R 3/00* (2006.01)

(52) U.S. Cl. ............................ 326/30; 326/26; 333/12; 345/58; 439/941

(58) Field of Classification Search ................ 326/30, 326/21, 26; 333/12; 439/941; 345/58
See application file for complete search history.

(56) References Cited

U.S. PATENT DOCUMENTS

| | | | | |
|---|---|---|---|---|
| 5,027,088 A | * | 6/1991 | Shimizu et al. | 333/1 |
| 5,374,861 A | * | 12/1994 | Kubista | 326/30 |
| 5,457,406 A | * | 10/1995 | Takada et al. | 326/30 |
| 5,502,392 A | * | 3/1996 | Arjavalingam et al. | 324/638 |
| 6,060,907 A | * | 5/2000 | Vishwanthaiah et al. | 326/87 |
| 6,211,703 B1 | * | 4/2001 | Takekuma et al. | 326/101 |

(Continued)

OTHER PUBLICATIONS

International Search Report for International Application No. PCT/EP03/15036, filing date Dec. 24, 2003.

(Continued)

*Primary Examiner*—Rexford Barnie
*Assistant Examiner*—Jason Crawford
(74) *Attorney, Agent, or Firm*—Morgan, Lewis & Bockius LLP

(57) ABSTRACT

The invention relates to a method and a device for transmission with reduced crosstalk in interconnections used for sending a plurality of signals, such as the interconnections made with flat multiconductor cables, or with the tracks of a printed circuit board, or inside an integrated circuit. An interconnection with four parallel transmission conductors plus a reference conductor has each of its ends connected to a termination circuit. The transmitting circuit receives at its input the signals of the four channels of the source and its output terminals are connected to the conductors of the interconnection. The receiving circuit's input terminals are connected to the conductors of the interconnection, and its four output channels are connected to the destination. The signals of the four channels of the source are sent to the four channels of the destination, without noticeable crosstalk.

20 Claims, 9 Drawing Sheets

U.S. PATENT DOCUMENTS 6,573,747 B1 * 6/2003 Radhakrishnan ............. 326/30
6,642,740 B1 * 11/2003 Kim et al. .................... 326/30

OTHER PUBLICATIONS

Abushaaban, M., et al., "Modal Circuit Decomposition of Lossy Multiconductor Transmission Lines," IEEE Transactions on Microwave Theory and Techniques, vol. 44, No. 7, Jul. 1996, pp. 1046-1056.

El-Zein, A., et al., "An Analytical Method for Finding the Maximum Crosstalk in Lossless-Coupled Transmission Lines," Proceedings of the IEEE/ACM Int'l Conf. on Computer Aided Design, Santa Clara, California, Nov. 8-12, 1992, pp. 443-448.

Huijsing, J.H., "Operational Floating Amplifier," J. of IEEE Proceedings, vol. 137, Pt. G., No. 2, Apr. 1990.

Li, G., et al., "Line-Modes Decomposition of Three-Conductor Transmission Lines," Microwave Conf. 2000, Sydney, Australia, Dec. 3-6, 2000.

Nguyen, T.H., et al., "Propagation Over Multiple Parallel Transmission Lines Via Modes," IBM Technical Disclosure Bulletin, IBM Corp., vol. 32, No. 11, Apr. 1990.

Nickel, J.G., et al., "Frequency-Domain-Coupled Microstrip-Line Normal-Mode Parameter Extraction From $S$-Parameters," IEEE Transactions on Electromagnetic Compatibility, vol. 43, No. 4, Nov. 2001, pp. 495-503.

Ott, H.W., "Noise Reduction Techniques in Electronic Systems," Chapter 4, 2d Ed., John Wiley & Sons, 1988, no month.

Paul, C.R., "Solution of the Transmission-Line Equation Under the Weak-Coupling Assumption," IEEE Transactions on Electromagnetic Compatibility, vol. 44, No. 3, Aug. 2002, pp. 413-423.

* cited by examiner

METHOD AND DEVICE FOR TRANSMISSION WITH REDUCED CROSSTALK

CROSS REFERENCE TO RELATED APPLICATIONS

This is the U.S. National Phase of PCT/EP2003/015036, filed Dec. 24, 2003, which in turn claims priority to French Application No. 03/00064, filed Jan. 6, 2003, both of which are incorporated herein in their entirety by reference.

FIELD OF THE INVENTION

The invention relates to a method and a device for transmission with reduced crosstalk through interconnections used for sending a plurality of signals, such as the ones made with flat multiconductor cables, or with the tracks of a printed circuit board, or inside an integrated circuit.

The French patent application number 0300064 of 6 Jan. 2003, entitled "Procédé et dispositif pour la transmission avec une faible diaphonie" is incorporated by reference.

PRIOR ART

Let us first consider the theoretical problem of an interconnection with n transmission conductors placed close to a reference conductor. Let us number these conductors from 0 to n, where 0 is the "reference conductor" which will be used as a reference for measuring voltages, and which is often called the ground conductor.

As an example, we have represented in FIG. 1 an interconnection with four parallel transmission conductors (1) between a source (2) and a destination (3). For instance, the source (2) may be composed of the four output circuits of an integrated circuit, the destination (3) may be composed of the four input circuits of an other integrated circuit, and the transmission conductors numbered 1, 2, 3 and 4 (this numbering does not show up in FIG. 1) may be the traces of a printed circuit board on which the two integrated circuits are soldered, the conductor 0 being a ground plane of this printed circuit board. Such an interconnection may clearly convey analog or digital signals. It is well known that, when the maximum frequency of the spectrum of the signals to be sent corresponds to a wavelength that is not very big compared to the length of the interconnection, it is useful to provide for the implementation of terminations (4) at the ends of the interconnection, these terminations being for instance made of resistors placed between each of the transmission conductors numbered from 1 to 4 and the reference conductor.

Note that such terminations are sometimes included in the circuits of the source and/or in the circuits of the destination. Note also that in some cases, a single termination is used.

As shown in the example in FIG. 2, an interconnection (1) may also be connected for instance to a plurality of line transmitters (2) and line receivers (3), where the line transmitters and/or line receivers are spread over the length of the interconnection. Architectures referred to as "data bus" are of this type. The techniques that make this type of structure possible, for instance the techniques through which the output of certain digital circuits can have a "high impedance" state, are well known. In the example in FIG. 2, the interconnection is terminated with a termination (4) at each end, as the one given in the example in FIG. 1.

We define any point along an interconnection of length L with a real curvilinear abscissa z, the interconnection extending from z=0 to z=L.

Any integer j greater than or equal to 1 and less than or equal to n corresponds to the number of a transmission conductor of the interconnection, that is to say to a conductor other than the reference conductor. This integer may therefore be used as an index in order to define, for each transmission conductor, two electrical variables, i.e. one current and one voltage. At a given abscissa z along the cable, we define in this manner the current $i_j$ flowing in the transmission conductor, and the voltage $v_j$ between the transmission conductor and the reference conductor. These n currents and these n voltages are respectively called natural currents and natural voltages. The wording "natural electrical variable" will indiscriminately designate a natural current or a natural voltage.

In order to clarify our vocabulary, we will now present some basis of the matrix theory of multiconductor transmission lines, which is well known to specialists. Elements of this theory are for instance presented in the book *Analysis of Multiconductor Transmission Lines* of C. R. Paul, published by John Wiley & Sons in 1994. When an interconnection can approximately be considered as having characteristics that are uniform over its length (that is to say independent of z), its characterization for the transmission of signals and for crosstalk may be obtained with a per-unit-length inductance matrix L, a per-unit-length resistance matrix R, a per-unit-length capacitance matrix C, and a per-unit-length conductance matrix G, all being independent of z. Specialists refer in this case to a uniform multiconductor transmission line. These matrices are symmetrical square matrices of order n, and they are frequency-dependent. The matrices L, R, C and G may be used to write two equations containing the column-vector I of the natural currents $i_1, \ldots, i_n$ and the column-vector V of the natural voltages $v_1, \ldots, v_n$ considered at the same abscissa z. We will therefore qualify these four matrices as "natural". These two equations are called telegrapher's equations by specialists, and may be written:

$$\begin{cases} \dfrac{dV}{dz} = -(R + j\omega L)I \\ \dfrac{dI}{dz} = -(G + j\omega C)V \end{cases} \quad (1)$$

where $\omega$ is the radian frequency.

We shall now use $Z=R+j\omega L$ to denote the per-unit-length impedance matrix and $Y=G+j\omega C$ to denote the per-unit length admittance matrix. It is well known to specialists that the equation (1) may be solved easily using a suitable diagonalization of the matrices ZY and YZ. The eigenvectors obtained in this manner define the propagation modes, and the eigenvalues correspond to the propagation constants. More precisely, we shall use T and S to denote two regular matrices such that:

$$\begin{cases} T^{-1}YZT = D \\ S^{-1}ZYS = D \end{cases} \text{where} \quad (2)$$

$$D = diag_n(\gamma_1^2, \ldots, \gamma_n^2) \quad (3)$$

is the diagonal matrix of order n of the eigenvalues. These eigenvalues are the squares of the propagation constants $\gamma_j$ for specific waves, which we shall identify later, propagating toward the far end (that is to say toward z=L). The matrices Z and Y being symmetrical, we observe that if we determine, with a diagonalization of the matrix YZ, a matrix T satisfying the first line of the equation (2), then $$S = {}^tT^{-1} \quad (4)$$

is one solution of the second line of the equation (2). This shows that if YZ is diagonalizable (which has been shown in interesting cases by many authors), then YZ and ZY are diagonalizable into the same matrix D. The use of equation (4) is not in any way necessary for solving the equation (2), and other choices are possible. Thus, for instance, another possible choice for obtaining a solution S for the second line of the equation (2) from a solution T of its first line is $$S = j\omega c_K Y^{-1} T \quad (5)$$

where $c_K$ is an arbitrary scalar different from zero, which may depend on the frequency, and which has the dimensions of a per-unit-length capacitance.

The matrices T and S solutions of the equations (2) and (3) define a "modal transform" for the natural currents and for the natural voltages, and the results of this transform are called modal currents and modal voltages. If we use $I_M$ to denote the vector of the n modal currents $i_{m1}, \ldots, i_{Mn}$ and $V_M$ to denote the vector of the n modal voltages $v_{M1}, \ldots, v_{Mn}$, we get:

$$\begin{cases} V = SV_M \\ I = TI_M \end{cases} \quad (6)$$

Consequently, we shall call S the "transition matrix from modal voltages to natural voltages", and T the "transition matrix from modal currents to natural currents" (for comparison with the French patent application number 0300064 of 6 Jan. 2003, it is useful to note that the transition matrix from the basis C to the basis B is called "matrice de passage de la base B àla base C" in French). The modal currents and the modal voltages have the remarkable property of being able to propagate along the transmission line without coupling to one another when they have a different index. We can point out that for a given j, a modal current $i_{Mj}$ and a modal voltage $v_{Mj}$ propagate with the same propagation constant $\gamma_j$ toward the far end (toward z=L), and with the opposite propagation constant $-\gamma_j$ toward the near end (toward z=0). The wording "modal electrical variable" will indiscriminately designate a modal current or a modal voltage. The matrices S and T are therefore the transition matrices from modal electrical variables to natural electrical variables.

We shall note that the equation (2) means that the column-vectors of S (respectively, of T) are linearly independent eigenvectors of ZY (respectively, of YZ), and consequently S and T are not defined in a unique manner by the equations (2) and (3) only, because: first the order of the eigenvalues in the equation (3) is arbitrary, and second the choice of eigenvectors corresponding to a degenerate eigenvalue is arbitrary. The implementation of an additional condition such as equation (4) or equation (5) does not remove this indetermination.

In order to indicate that a matrix S and a matrix T are defined by the relations (2), (3) and (5) we shall say that they are "associated". In this case, it is clear that for any integer j between 1 and n the j-th column-vector of S corresponds to the same eigenvalue as the j-th column-vector of T.

As from the equations (1), (2) and (3), it is possible to define the characteristic impedance matrix $Z_C$ of the multiconductor transmission line, as:

$$Z_C = S\Gamma^{-1}S^{-1}Z = S\Gamma S^{-1}Y^{-1} = Y^{-1}T\Gamma T^{-1} = ZT\Gamma^{-1}T^{-1} \quad (7)$$

where $$\Gamma = \text{diag}_n(\gamma_1, \ldots, \gamma_n) \quad (8)$$

is the diagonal matrix of order n of the propagation constants $\gamma_i$, which have the dimensions of the inverse of a length. This characteristic impedance matrix is such that:

a) for any wave propagating on the multiconductor transmission line toward increasing z, the column-vector of the natural voltages V⁻ is related to the column-vector of the natural currents I⁻ by:

$$V^+ = Z_C I^+ \quad (9)$$

b) for any wave propagating on the multiconductor transmission line toward decreasing z, the column-vector of the natural voltages V⁻ is related to the column-vector of the natural currents I⁻ by:

$$V^- = -Z_C I^- \quad (10)$$

Using a well-known reasoning, one obtains that at one end of the multiconductor transmission line connected to a linear (n+1)-terminal device (one terminal of which is connected to the reference conductor, and the n other terminals of which are connected to the n transmission conductors) presenting to the multiconductor transmission line an impedance matrix equal to its characteristic impedance matrix, no reflection occurs for incident waves.

It is also possible to show that, when the matrix S and the matrix T are associated:

c) for any wave propagating on the multiconductor transmission line toward increasing z, the column-vector of the modal voltages $V_M^+$ is related to the column-vector of the modal currents $I_M^+$ by:

$$V_M^+ = \frac{1}{j\omega c_K} \Gamma I_M^+ \quad (11)$$

d) for any wave propagating on the multiconductor transmission line toward decreasing z, the column-vector of the modal voltages $V_M^-$ is related to the column-vector of the modal currents $I_M^-$ by:

$$V_M^- = -\frac{1}{j\omega c_K} \Gamma I_M^- \quad (12)$$

It is necessary to state that, according to the theory of multiconductor transmission lines, the presence of a reference conductor is necessary. However, a priori no specific physical characteristic distinguishes what we have called a transmission conductor (which some authors call a signal conductor) from the reference conductor. Designating a conductor as the reference conductor is only a theoretical requirement. In practice however, we note that electronic apparatuses often make a specific use of the ground of a circuit, which is a set of interconnected conductors, because the circuits make a preferred use of the voltages defined with respect to the ground. Whenever possible, it is therefore natural to select the ground as the reference conductor. We shall also note that a conductor of the interconnection other than the reference conductor is always called "transmission conductor", and that this does not mean that it is necessarily used for the transmission of a signal. It is for instance customary to connect some of the transmission conductors to ground, in order to reduce the crosstalk It is also important to clearly distinguish the interconnection, a physical device implementing conductors and insulators, from the model which describes some of its properties, in this case the model of the multiconductor transmission line uniform over its length. Besides, this model is not capable of describing all interconnections. One can show that this model is well suited for describing the behavior of interconnections whose conductors are all parallel cylinders (not necessarily of revolution) sufficiently close with respect to the wavelength of the signal being considered, these conductors being surrounded by dielectrics the characteristics of which are uniform over the length of the interconnection. This model may also appropriately describe interconnections made of conductors which are parallel and sufficiently close over only the greatest part of their length, and also other types of interconnection.

The person skilled in the art knows that it is generally necessary to include all conductors between which a significant coupling is likely to occur, in the multiconductor transmission line model. Thus, according to a first example, an unshielded flat cable with 8 conductors laying flat on a flat conductor over all its length must normally be treated as an interconnection having 9 conductors including the reference conductor, even if one of the conductors of the flat cable has been designated as reference conductor. According to a second example, if a second unshielded flat cable with 8 conductors is flattened against the first one, the whole must normally be treated as an interconnection with 17 conductors. According to a third example, when a multiconductor cable has a screen surrounding its internal conductors, this screen must be regarded as one of the conductors of the interconnection.

We note that the reference conductor is sometimes made of several sufficiently interconnected conductors. This is for instance the case with the stripline structure well known to the person skilled in the art, in which the reference conductor is made of two interconnected ground planes. By the same token, it is appropriate to treat as a single reference conductor a plurality of conductors between which a low impedance is maintained in the operating frequency band, at a sufficient number of points along the direction of propagation. As an example, in a multilayer printed circuit board, the traces of an internal layer, used as transmission conductors, may be routed between a conducting plane used for the ground (ground plane) and a conducting plane connected to a power supply voltage. The person skilled in the art knows that if a low impedance is maintained between these conducting planes by several decoupling capacitors connected between these conducting planes and spread over along internal traces, then the two conducting planes, though at different potentials, behave indeed as a single reference conductor for the propagation of signals. In the following, the wording "a reference conductor" may therefore designate a reference conductor connected to one or several other conductors, at a sufficient number of points along the direction of propagation, through impedances sufficiently low in the frequency band of operation.

The elementary theoretical principles which we have just presented are the basis of a computation method which enables predicting crosstalk in interconnections. In the case of interconnections used for transmitting a plurality of signals, the crosstalk is an undesirable phenomenon, and designers try to minimize it, as far as possible. The state of the art as regards fighting against crosstalk in interconnections mainly implements the following techniques:

1) the use of balanced transmission lines, also called symmetrical transmission lines, to which sources of differential signals and receivers of differential signals are connected, as explained for instance in Chapter 4 of the book *Noise Reduction Techniques in Electronic Systems* by H. W. Ott, second edition, published by John Wiley & Sons in 1988;
2) the termination of each pair of a set of balanced transmission lines by its connection to a "matched impedance" between the two conductors of the pair, at one and/or the other end, as in the termination of telephone lines (which also reduces the echo problem);
3) in the case of unbalanced transmission lines, by increasing the distance between each of the transmission conductors 1 to n, for instance by moving the traces corresponding to these transmission conductors away from each other in the case of printed circuit board;
4) in the case of unbalanced transmission lines, by decreasing the distance between each of the transmission conductors 1 to n and the reference conductor, for instance by using as the reference conductor a ground plane layer under the traces corresponding to the transmission conductors 1 to n, in the case of a printed circuit board;
5) in the case of unbalanced transmission lines, by decreasing the bandwidth used for the signals;
6) in the case of unbalanced transmission lines, by terminating each transmission conductor by a connection to a linear dipole with a "matched impedance", the other terminal of this linear dipole being connected to the reference conductor (which also reduces the echo problem);
7) by using grounded conductors to separate the signals to be sent, for instance in cables including conductors dedicated to the function of screening, called screens, or according to an other example, by using some of the transmission conductors as screens.

The techniques of 1) and 2) above, which are often implemented on twisted pair cables, achieve excellent performance, but they require the use of two transmission conductors for each signal to be sent, which is economically disadvantageous. They are difficult to implement beyond a few hundred megahertz. The technique of 7) is also expensive.

The techniques of 3) and 4) above are efficient when used jointly, but this approach takes up room, a factor that is difficult to accept in current printed circuit boards as well as in cables. The technique of 5) cannot be used in many situations in which the characteristics of the signals, and therefore their spectrum, are specified.

The techniques of 2) and of 6) above are based on a simple principle: the echo waves are undesirable and they themselves give rise to some crosstalk. Decreasing the echo waves therefore enables reducing the crosstalk. It is also necessary to clarify what is meant by "matched impedances" in the wording of these techniques: it is a question of the impedance of a dipole which is used to minimize the reflections of a signal on the pair being considered in the case of technique 2), or on the transmission conductor being considered in the case of technique 6). The authors who are accurate on this point generally consider that the value to be assigned to the "matched impedance" of a transmission conductor is the characteristic impedance of the line with a single transmission conductor (plus a return conductor e.g. the reference conductor) obtained when the propagation on the other transmission conductors of the interconnection is not considered. The person skilled in the art understands that this point of view is an approximation which can only be fully justified in the case where the coupling with the other transmission conductors is very weak. In general, these "matched impedances" do not produce a termination showing an impedance matrix near the characteristic impedance matrix to the interconnection. For instance, the terminations (4) of the device presented in FIG. 1 and FIG. 2 are made of "matched impedances" of this type.

Note finally that according to variations of technique 6), designers, in order to limit the power consumed by a signal present at the terminals of such a "matched load", may replace it with a resistance in series with a capacitor, in such a way that the matched impedance only appears at the highest frequencies of the spectrum of the signals transmitted, frequencies for which the crosstalk is often the most detrimental. Other designers also use non linear terminations, for instance using diodes.

One may say that these techniques are limited in the following manner: their performance levels are low, or they require a substantial cross dimension of the interconnection, because of the increased spacing of the transmission conductors, or because of the use of a much larger number of conductors (typically twice the number) than the number of signals to be sent.

DESCRIPTION OF THE INVENTION

The purpose of the method of the invention is the transmission with reduced crosstalk through interconnections with two or more transmission conductors, without the limitations of these known techniques.

The invention is about a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the method comprising the steps of:

modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

determining, for the multiconductor transmission line and the known frequency band, the characteristic impedance matrix and a transition matrix from modal electrical variables to natural electrical variables;

placing at at least one end of the interconnection, a termination circuit having an impedance matrix approximating the characteristic impedance matrix;

combining the m input signals in one of the transmitting circuits without using a transformer for this purpose, according to linear combinations defined by the transition matrix from modal electrical variables to natural electrical variables, so as to obtain at the output of said one of the transmitting circuits, output being connected to the n transmission conductors, the generation of modal electrical variables, each being proportional to a single signal among the input signals; and combining in one of the receiving circuits, the input of which is connected to the n transmission conductors, without using a transformer for this purpose, the signals present on the transmission conductors, according to linear combinations defined by the inverse of the transition matrix from modal electrical variables to natural electrical variables, so as to obtain at the output of said one of the receiving circuits m output signals each corresponding to one of the transmission channels, each output signal being proportional to a single modal electrical variable among the modal electrical variables.

The person skilled in the art fully understands the principles implemented by the invention.

It uses a superposition of waves being each composed of a unique modal electric variable corresponding to a channel, because these waves have the following properties:

a) the wave of a modal electrical variable propagates along the multiconductor transmission line without being coupled to other modal electrical variables of a different index, which follows from the explanations given above after the equation (6);

b) at one end of the multiconductor transmission line connected to a termination circuit presenting an impedance matrix near the characteristic impedance matrix, the wave of a modal electrical variable is absorbed, without giving rise to any significant reflected wave, which results from the property stated above, after the equations (9) and (10).

These properties show that the propagation of waves each corresponding to a single modal variable, produced with a suitable conversion in one of the transmitting circuits and used with an inverse conversion in one of the receiving circuits enables transmission without crosstalk between the channels.

Any of the n natural voltages (respectively, natural currents) being a linear combination of the n modal voltages (respectively, modal currents), according to equation (6), it appears that the value of a natural electrical variable a priori depends on the value of each of the signals present on each of the n channels. This is radically different from the behavior expected from devices such as those presented in FIG. 1 and FIG. 2.

The person skilled in the art understands that the function of the termination circuits is to ensure that no reflection of an incident signal of a disturbing level occurs at an end of the interconnection. It is clear that the lower the desired maximum crosstalk coupling level, the lower will be the level of reflection of incident signals which will have to be regarded as disturbing, and that, in order not to exceed this level, it must be specified that the termination circuit must have an impedance matrix that is closer to the characteristic impedance matrix.

In order to ensure that no reflection of an incident signal of a disturbing level occurs at an end of the interconnection, the person skilled in the art understands that it is sufficient, when one or more transmitting circuits are connected at a single end of the interconnection, to arrange a termination circuit presenting an impedance matrix sufficiently close to the characteristic impedance matrix, at the other end of the interconnection. The person skilled in the art also sees that in all other cases, that is to say when a transmitting circuit is connected elsewhere than at one end of the interconnection, and/or when transmitting circuits are connected at both ends of the interconnection, it is necessary, in order to ensure that no reflection of an incident signal of a disturbing level occurs at an end of the interconnection, to arrange a termination circuit presenting an impedance matrix sufficiently close to the characteristic impedance matrix at both ends of the interconnection.

Thus, according to the method of the invention we may:
either arrange at one end only of the interconnection, a termination circuit with an impedance matrix near the characteristic impedance matrix
or arrange at both ends of the interconnection, a termination circuit with an impedance matrix near the characteristic impedance matrix.

In order that this principle results in the desired characteristics, it is important that the interconnection behaves like a multiconductor transmission line uniform over its length, because a lack of homogeneity such as a variation of the characteristic impedance matrix with respect to z may produce detrimental couplings between the channels, that is to say, crosstalk. Note that the effect of inhomogeneity depends on the wavelength of the signals transmitted, and therefore on their frequency, as it is legitimate to consider that, in practice, the waves are only affected by a moving average of the natural matrices along the interconnection, over a distance corresponding to a fraction of the wavelength. Consequently, on a perfectly uniform interconnection except for a localized inhomogeneity, the effect of the inhomogeneity is relatively less at lower frequencies, given that, for bigger wavelengths, the effect of the inhomogeneity is smoothed by an averaging on a greater length. This phenomenon is beneficial because inhomogeneity is unavoidable in practice, for instance at the connection point of a transmitting circuit or of a receiving circuit. For instance, such a inhomogeneity may correspond to a lumped capacitance matrix caused by the transmitting circuit or by the receiving circuit, corresponding to lumped impedances.

In some cases, in order to take into account the lumped impedances seen by the interconnection and caused by the circuits connected to it elsewhere than at its ends, the designer need only observe that they are not present or that they may be ignored. In other cases, in order to take into account the lumped impedances seen by the interconnection and caused by the circuits connected to it elsewhere than at its ends, the designer must quantitatively consider these lumped impedances to obtain a multiconductor transmission line having sufficiently uniform electrical characteristics over its length. For instance, the interconnection could see a receiving circuit as a capacitance matrix adding to its own capacitance matrix: this lumped capacitance could therefore be offset by a suitably proportioned local modification of the geometrical characteristics of the interconnection in the vicinity of the connection point. As a second example, capacitance matrices localized at connection points regularly spaced along the interconnection could be taken into account to obtain a prescribed average p.u.l. capacitance matrix relevant up to a given maximum frequency, by using suitably proportioned transmission conductors.

According to the invention, the modal electrical variables generated by a transmitting circuit are each proportional to a single signal among the input signals. Since m signals must be sent, there are at least m modal electrical variables. According to the method of the invention, it is possible, in particular, to obtain the generation of m modal electrical variables at the output of a transmitting circuit. This may be the most economical procedure. However, it is also conceivable, when m is less than n, that more than m modal electrical variables are generated for the m input signals.

According to the method of the invention, the number m of transmission channels between any one of the transmitting circuits and any one of the receiving circuits may be equal to the number n of transmission conductors. This method is preferred because it is generally the most economical. However, it is also conceivable to use a number n of transmission conductors, greater than the number m of channels (this case is mentioned in the "Indications on Industrial Applications" section below).

According to the method of the invention, the electrical variables maybe either all voltages or all electric currents. Note that, when the matrices S and T are associated, according to the equations (11) and (12), considering that Γ is a diagonal matrix, we may say that in a given direction of propagation, for any integer j between 1 and n, the modal voltage $v_{Mj}$ is proportional to the modal current $i_{Mj}$. Therefore:
it is physically equivalent that a transmitting circuit "generates modal voltages on the transmission conductors, where each modal voltage is proportional to only one of the input signals", or that it "generates modal currents on the transmission conductors, where each modal current is proportional to only one of the input signals", and
it is physically equivalent that a receiving circuit delivers at its output "m output signals each corresponding to one of the transmission channels, where each output signal is proportional to only one of the modal voltages", or that it delivers at its output "m output signals each corresponding to one of the transmission channels, where each output signal is proportional to only one of the modal currents".

Therefore, the use of either currents or voltages as electrical variables is without physical effect. From the standpoint of design, it could be more pleasant to use currents or voltages depending on the type of device selected to implement the method. For instance, to proportion a transmitting circuit presenting a low impedance to the interconnection, the designer may prefer to speak of modal voltages, whereas, on the contrary, to proportion a transmitting circuit presenting a high impedance to the interconnection, the designer may prefer to speak of modal currents.

According to the method of the invention, conductors and dielectrics may be used such that the section of the interconnection in a plane orthogonal to the direction of propagation does not change, except for a scale factor, over the greatest part of the length of the interconnection, in the vicinity of the transmission conductors. The person skilled in the art knows that this condition indeed allows maintaining practically uniform electrical characteristics over the length of the interconnection. This condition especially includes the standard case of straight interconnection, therefore parallel to an axis, and invariant by a translation along this axis, in the vicinity of the transmission conductors. But contrary to this case, this condition also includes the case where the transmission conductors are curved. Finally, note that this condition is generally not compatible with the implementation of a balanced transmission line, because the balance of the interconnection, which implies notably that some p.u.l capacitance values be equal, depends upon the technique of twisting. There are however some exceptions where this condition can be met with a balanced interconnection. For instance, for n=2, an exception of this type implements an interconnection made of two straight transmission conductors parallel to a ground plane constituting the reference conductor, where the interconnection is symmetrical with respect to a plane P orthogonal to the ground plane, the plane P containing a straight line parallel to the transmission conductors.

Detailed examples given below include a schematic diagram according to the invention, in the case of a balanced interconnection for which n=2 and in the case of an interconnection for which n=3. When n is greater than or equal to three, the interconnections are often not balanced. It is therefore important to note that, according to the method of the invention, n may be greater than or equal to three.

Note that, in many possible cases, as the person skilled in the art knows, we can consider that, when computing the matrices $Z_C$, S and T of the multiconductor transmission line, the losses are negligible in some frequency bands, for instance for frequencies greater than 100 kHz, and that in this case, the characteristic impedance matrix is real and frequency-independent, and the matrices S and T chosen may be real and frequency-independent. Conversely, at frequencies lower than 10 kHz, losses are often not negligible and the characteristic impedance matrix cannot be considered as real, which obviously leads to a more complex implementation of the method of the invention. However, this question can often be disregarded, because the crosstalk at frequencies lower than 10 kHz may in many cases be ignored, and in these cases, it may be of no importance that the termination circuits arranged at one end or both ends of the interconnection present an impedance matrix near the characteristic impedance matrix at these frequencies.

The method of the invention is therefore particularly suited to the case where the known frequency band contains frequencies ranging from 100 kHz to 100 GHz.

The person skilled in the art knows, for instance, from a computation based on the geometry of the conductors and insulators, on the conductivity of the conductors and on the permittivity and the losses of the insulators, how to determine the natural matrices L, R, C and G of a multiconductor transmission line, as a function of frequency. The person skilled in the art also knows how to measure these matrices. It is therefore clear that it is possible to accurately determine the characteristic impedance matrix of the multiconductor transmission line in any frequency interval, up to the maximum frequency for which the transmission line theory is applicable. This maximum frequency depends on the cross dimensions of the interconnection, and the person skilled in the art knows that it corresponds to the appearance of the first non-evanescent propagation modes other than the quasi-TEM modes. In this same frequency interval, it is obviously also possible to determine a "transition matrix from modal voltages to natural voltages" S and/or a "transition matrix from modal currents to natural currents" T, as a function of frequency, so as to define modal voltages and/or modal currents.

The characteristic impedance matrix and a suitable choice of the matrices S and/or T may therefore be determined, for instance, in two distinct contexts: firstly when the interconnection has been chosen and the method of the invention must be applied to the interconnection by adapting the other parts of a device implementing this method, secondly when the parts of a device implementing this method, other than the interconnection, have been defined beforehand, and an appropriate interconnection should be designed.

A device for proportioning the circuits used in a method of the invention is described in the next sentence. A device for proportioning the circuits used in a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, may comprise:

means for modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

means for determining, for the multiconductor transmission line and the known frequency band, the characteristic impedance matrix and a transition matrix from modal electrical variables to natural electrical variables;

means for proportioning a termination circuit having an impedance matrix approximating the characteristic impedance matrix;

means for proportioning one of the transmitting circuits which combines the m input signals, without using a transformer for this purpose, according to linear combinations defined by the transition matrix from modal electrical variables to natural electrical variables, so as to obtain at the output of said one of the transmitting circuits, output being connected to the n transmission conductors, the generation of modal electrical variables, each being proportional to a single signal among the input signals; and means for proportioning one of the receiving circuits, the input of which is connected to the n transmission conductors, which combines, without using a transformer for this purpose, the signals present on the transmission conductors according to linear combinations defined by the inverse of the transition matrix from modal electrical variables to natural electrical variables, so as to obtain at the output of said one of the receiving circuits m output signals each corresponding to one of the transmission channels, each output signal being proportional to a single modal electrical variable among the modal electrical variables.

The device for proportioning the circuits used in a method of the invention may be such that the means for modeling the interconnection comprise means for measuring and/or for computing the real electrical characteristics of the interconnection, based on the relative layout of the transmission conductors and the reference conductor, and on the characteristics of the dielectrics surrounding them.

The device for proportioning the circuits used in a method of the invention may be such that the means for modeling the interconnection comprise:

means for calculating one or more error coefficients for variance between the actual electrical characteristics of the interconnection and the desired characteristics, for the known frequency band; and means for optimizing the relative position of the transmission conductors by minimizing the error coefficients or coefficients.

A device for implementing the method of the invention is described in the next sentence. A device for transmission providing, in a known frequency band, m transmission channels each corresponding to a signal to be sent from the input of at least one transmitting circuit to the output of at least one receiving circuit, where m is an integer greater than or equal to 2, comprises:

an interconnection with n transmission conductors and a reference conductor, n being an integer greater than or equal to m, the interconnection being proportioned in such a way that the interconnection may, taking into account the lumped impedances seen by the interconnection and caused by the circuits connected to the interconnection elsewhere than at the ends of the interconnection, be modeled as a multiconductor transmission line having uniform electrical characteristics over its length for the known frequency band;

one or two termination circuits, each arranged at one end of the interconnection and each having, in the known frequency band, an impedance matrix approximating the characteristic impedance matrix of the multiconductor transmission line, the termination circuits, if there are several termination circuits, being each arranged at a different end of the interconnection;

at least one of the transmitting circuits for combining the m input signals, without using a transformer for this purpose, according to linear combinations defined by a transition matrix from modal electrical variables to natural electrical variables, in order to obtain at the output of said one of the transmitting circuits, output being connected to the n transmission conductors, the generation of modal electrical variables, each being proportional to a single signal among the input signals; and at least one of the receiving circuits, the input of which is connected to the n transmission conductors for combining, without using a transformer for this purpose, the signals present on the transmission conductors, according to linear combinations defined by the inverse of the transition matrix from modal electrical variables to natural electrical variables, so as to obtain at the output of said one of the receiving circuits m output signals each corresponding to one of the transmission channels, each output signal being proportional to a single modal electrical variable among the modal electrical variables.

Note that, as mentioned above, a device for implementing the method of the invention may:

either comprise only at one end of the interconnection, a termination circuit with an impedance matrix near the characteristic impedance matrix, or comprise at both ends of the interconnection, a termination circuit with an impedance matrix near the characteristic impedance matrix.

In a device for implementing the method of the invention, it is possible to obtain the generation of m modal electrical variables at the output of a transmitting circuit.

In a device for implementing the method of the invention, it is possible that the number m of transmission channels between any one of the transmitting circuits and any one of the receiving circuits is equal to the number n of transmission conductors.

In the case where m=n, each mode has a corresponding transmission channel. Let $X_I$ be the column-vector of the n input signals $x_{I1}, \ldots, x_{Im}$ of a transmitting circuit, and let $X_O$ be the column-vector of the n output signals $x_{O1}, \ldots, x_{On}$ of a receiving circuit. These signals may be voltages or currents. According to the invention, there is a proportionality between each modal voltage produced by a transmitting circuit and the input signal of the corresponding channel. Using a suitable numbering of the input signals, we may therefore write:

$$V_M = \text{diag}_n(\alpha_1, \ldots, \alpha_n) X_I \quad (13)$$

where $V_M$ is the vector of the modal voltages produced by the transmitting circuit, and $\text{diag}_n(\alpha_1, \ldots, \alpha_n)$ is the diagonal matrix of the non-zero proportionality coefficients $\alpha_i$. The dimensions of each of these coefficients depend upon the dimensions of the input signals; if for instance these input signals are voltages, the coefficients $\alpha_i$ will be dimensionless. Therefore, using the equation (6), we see that the transmitting circuit must produce, on each conductor, at its point of connection to the interconnection, the natural voltages of the vector V given by:

$$V = S \, \text{diag}_n(\alpha_1, \ldots, \alpha_n) X_I \quad (14)$$

Moreover, given that, for each channel, a receiving circuit produces at its output, a signal practically proportional to the modal voltage corresponding to the channel, we may, with a suitable numbering of the output signals, write that:

$$X_O = \text{diag}_n(\beta_1, \ldots, \beta_n) V_M \quad (15)$$

where $V_M$ is the vector of the modal voltages received by the receiving circuit, and $\text{diag}_n(\beta_1, \ldots, \beta_n)$ is the diagonal matrix of the non-zero proportionality coefficients $\beta_i$. The dimensions of these coefficients depend upon the dimensions of the output signals: if for instance the output signals are currents, $\beta_i$ will have the dimensions of admittance. We see that the receiving circuit must read the set of conductors, to obtain the modal voltages by applying equation (6). Therefore, if, at the connection point of the receiving circuit to the interconnection, the vector of the natural voltages is V, the output signals are given by:

$$X_O = \text{diag}_n(\beta_1, \ldots, \beta_n) S^{-1} V \quad (16)$$

Given that, according to the invention, the waves propagate on the interconnection as they would in a uniform multiconductor transmission line, without significant reflection at the ends, it is possible, using equations (13) and (15), to clarify how the transmission of signals takes place. Between a transmitting circuit and a receiving circuit whose connection points to the interconnection show a difference of curvilinear abscissa $\Delta L$, for any integer i between 1 and n included, we obtain:

$$x_{Oi} = \alpha_i \beta_i e^{-\gamma_i |\Delta L|} x_{Ii} \quad (17)$$

According to (14), this transmitting circuit must produce, for any one of its output terminals i, the linear combination of the signals of the input channels using the coefficients of the i-th line-vector of the matrix obtained by multiplying each column j of the matrix S by a coefficient $\alpha_j$. According to (16), the receiving circuit mentioned above must produce, for any one of its output channels i, the linear combination of the voltages at its input terminals using the coefficients of the i-th line-vector of the matrix $S^{-1}$ multiplied by the coefficient $\beta_i$.

The person skilled in the art knows that such linear combinations, may, for instance, be implemented with operational amplifiers (in the frequency bands where devices of this type may operate) and circuit elements of suitable impedance. Transformers can also be used to obtain some linear combinations, but it is difficult and expensive to obtain all linear combinations using transformers. Moreover, transformers have a limited passband (for instance three decades of frequency), and they block DC. This is why, in the wording of the method of the invention, the use of transformers is excluded for obtaining linear combinations.

A device for implementing the method of the invention may be such that the electrical variables are either all voltages or all currents, and the two formulations are in fact equivalent. Instead of equations (13) to (16), note that we could also have written, for a transmitting circuit $$I_M = \text{diag}_n(\alpha_1, \ldots, \alpha_n) X_I \quad (18)$$

$$I = T \, \text{diag}_n(\alpha_1, \ldots, \alpha_n) X_I \quad (19)$$

where $I_M$ is the vector of the modal currents produced by the transmitting circuit, I is the vector of the corresponding natural currents, and $\text{diag}_n(\alpha_1, \ldots, \alpha_n)$ is the diagonal matrix of the non-zero proportionality coefficients $\alpha_i$, and, for the receiving circuit $$X_0 = \text{diag}_n(\beta_1, \ldots, \beta_n) I_M \qquad (20)$$

$$X_0 = \text{diag}_n(\beta_1, \ldots, \beta_n) T^{-1} I \qquad (21)$$

where $I_M$ is the vector of the modal currents received by the receiving circuit, I is the vector of the corresponding natural currents, and $\text{diag}_n(\beta_1, \ldots, \beta_n)$ is the diagonal matrix of the non-zero proportionality coefficients $\beta_i$. The proportionality coefficients appearing in equations (13) to (17) are obviously not the same as the ones appearing in equations (18) to (21).

In a device for implementing the method of the invention, it is possible that the section of the interconnection in a plane orthogonal to the direction of propagation does not change, except for a scale factor, over the greatest part of the length of the interconnection, in the vicinity of the transmission conductors.

A device for implementing the method of the invention may in particular be such that n is greater than or equal to three.

A device for implementing the method of the invention may preferentially be such that the known frequency band contains frequencies between 100 kHz and 100 GHz.

We have already mentioned that it is often possible, for instance at frequencies greater than 100 kHz, to obtain real and frequency-independent matrices $Z_C$, S and T. In this case, it is clear for the person skilled in the art that a termination circuit having, in the known frequency band, an impedance matrix approximating the characteristic impedance matrix, could for instance be made of a network of resistors, and the computations needed to proportion this network are not difficult.

A device for implementing the method of the invention may be such that the termination circuit or the termination circuits are made of a network of resistors.

Termination circuits made of a network of resistors are however not at all a characteristic of the invention. By way of example, as mentioned in the Prior Art section, designers may, in order to limit the power consumed by a signal present at the terminals of termination circuits, choose to allow these terminals to be effective only in a relevant interval of frequency, for instance by including suitable reactive circuit elements in the termination circuits. Another example is that terminations circuits could include active circuit elements.

In the case where real matrices $Z_C$, S and T are considered, and where the chosen coefficients $\alpha_i$ and $\beta_i$ of the equations (13) to (21) are real, it is also clear for the person skilled in the art that the linear combinations specified in the transmitting circuits and in the receiving circuits may be built using operational amplifiers (in the frequency bands where devices of this type may operate) and resistors. However, at relatively high frequencies, unwanted phase differences in operational amplifier circuits may become unavoidable, and may possibly produce non-real values for coefficients $\alpha_i$ and $\beta_i$.

In the case where it may be useful to take losses into account when determining the matrices $Z_C$, S and T, it is likely that these matrices are not real and frequency-independent any more, and it becomes necessary to synthesize the termination circuits and/or receiving circuits and/or transmitting circuits, using methods well known to the persons skilled in the art, such that the synthesized circuits include reactive circuit elements. Such a synthesis may for instance implement active circuit elements.

According to the invention, it is specified that it must be possible to model the interconnection as a multiconductor transmission line having uniform electrical characteristics over its length for the known frequency band, taking into account the lumped impedances seen by the interconnection and caused by the circuits connected to it elsewhere than at its ends. In order to take these lumped impedances into account by merely stating they are not present or that they may be ignored, these circuits must be such that they do not disturb the propagation along the multiconductor transmission line. The person skilled in the art sees that this result can for instance be obtained by:

using transmitting circuits and/or receiving circuits connected in series to the conductors of the interconnection, and showing a low series impedance using transmitting circuits and/or receiving circuits connected in parallel to the conductors of the interconnection, and showing a high parallel impedance.

A device for implementing the method of the invention may therefore be such that the transmitting circuit(s) and the receiving circuit(s) are connected in parallel to the interconnection, and such that the interconnection sees a high impedance in the connections of the transmitting circuit(s) and the receiving circuit(s). In this case, the designer may well consider that the transmitting circuit operates as a current source, and use equation (19). Alternatively, the designer may use the voltage angle and apply equation (14) considering that:

if the device for implementing the method of the invention is such that only one end of the interconnection is connected to a termination circuit with an impedance matrix near the characteristic impedance matrix, then the other end is connected to the transmitting circuit having a high impedance, consequently the output of the transmitting circuit sees an impedance matrix near $Z_C$, and therefore $$I = Z_C^{-1} S \, \text{diag}_n(\alpha_1, \ldots, \alpha_n) X_I \qquad (22)$$

if the device for implementing the method of the invention is such that both ends of the interconnection are connected to a termination circuit with an impedance matrix near the characteristic impedance matrix, then the output of the transmitting circuit sees an impedance matrix near $Z_C/2$, and therefore $$I = 2 Z_C^{-1} S \, \text{diag}_n(\alpha_1, \ldots, \alpha_n) X_I \qquad (23)$$

The designer shall of course keep in mind that $\text{diag}_n(\alpha_1, \ldots, \alpha_n)$ does not mean the same thing in equation (19) and in equations (14), (22) and (23).

However, the connection of the transmitting circuits and/or the receiving circuits in parallel with the interconnection is not at all a characteristic of the invention. According to the invention, the transmitting circuit(s) and/or the receiving circuit(s) may be connected in series to the interconnection, in which case they must generally show a low series impedance to the interconnection, in order not to disturb the propagation of waves along the interconnection. The seventh embodiment of a device of the invention, described below as an example, comprises a transmitting circuit connected in series to the interconnection.

A device of the invention may be such that the termination circuits, the transmitting circuit(s), and the receiving circuit(s) are without any part in common to any two of them.

Conversely, a device of the invention may be such that the termination circuits, the transmitting circuit(s), and the receiving circuit(s) are not without a part or parts common to any two of them. This possibility will be discussed below in the presentation of the fourth, fifth and sixth embodiments provided as examples.

According to the prior art, the person skilled in the art knows that the crosstalk in an interconnection having parallel conductors is low at low frequencies, and that it strongly depends both on the frequency and on the length of the interconnection. These properties usually limit the maximum length of the interconnection and its maximum frequency of operation. A device of the invention, in which we observe that the crosstalk, that can be calculated, depends little on the frequency and the length of the interconnection, does away with these limitations.

The prior art required, for obtaining very low crosstalk on interconnections, that they have a complex three-dimensional structure, that they contain for instance a twisted pair for each channel, or a screen for each channel. According to the invention, reduced crosstalk may be obtained merely by creating an interconnection with parallel conductors, hence cutting down cost and size.

Finally, we note that according to the prior art, the desired propagation of a signal on a single conductor corresponds to the propagation of several modes, at different propagation velocities, causing a modal dispersion well known to specialists. In the time domain, this modal dispersion distorts the signals. According to the invention, each signal is propagated using a single mode. There is therefore no modal dispersion, which increases the passband of the interconnection and the maximum length it may have.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
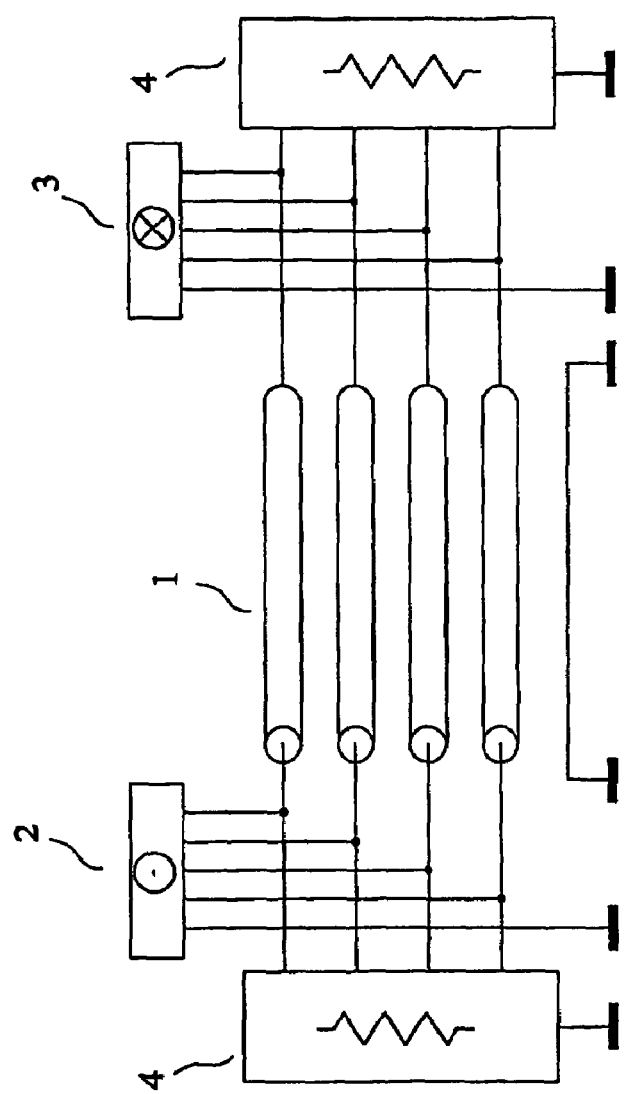
FIG. 1 shows an interconnection having 4 parallel transmission conductors, which has already been discussed in the section dedicated to the presentation of prior art.
Figure 2:
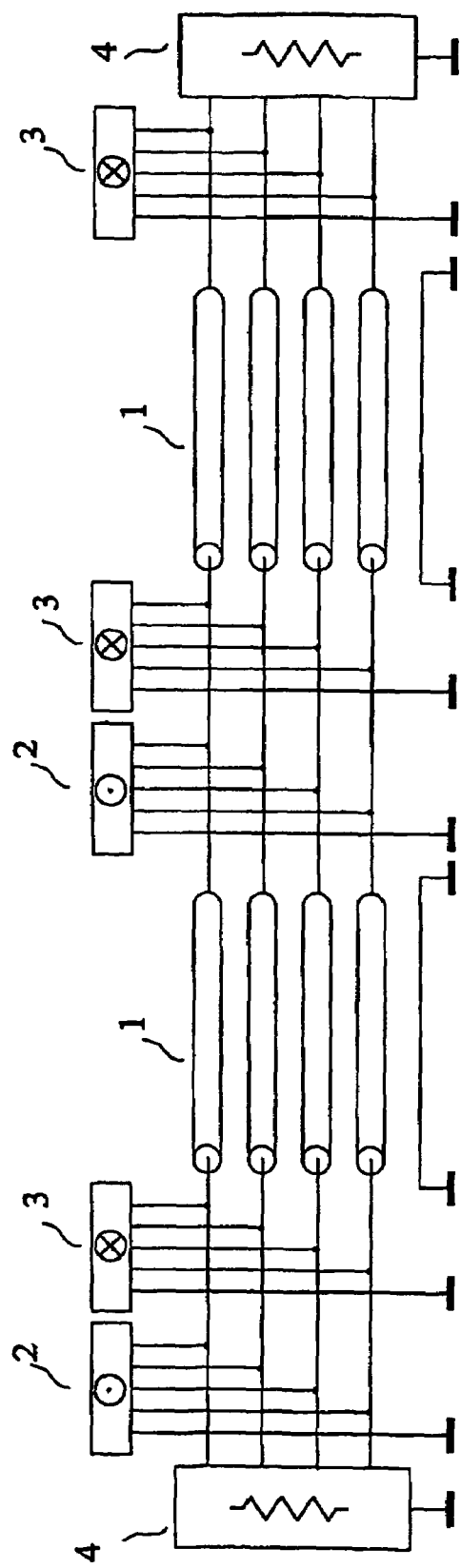
FIG. 2 shows an interconnection linking a plurality of line transmitters and receivers, which has already been discussed in the section dedicated to the presentation of prior art.
Figure 3:
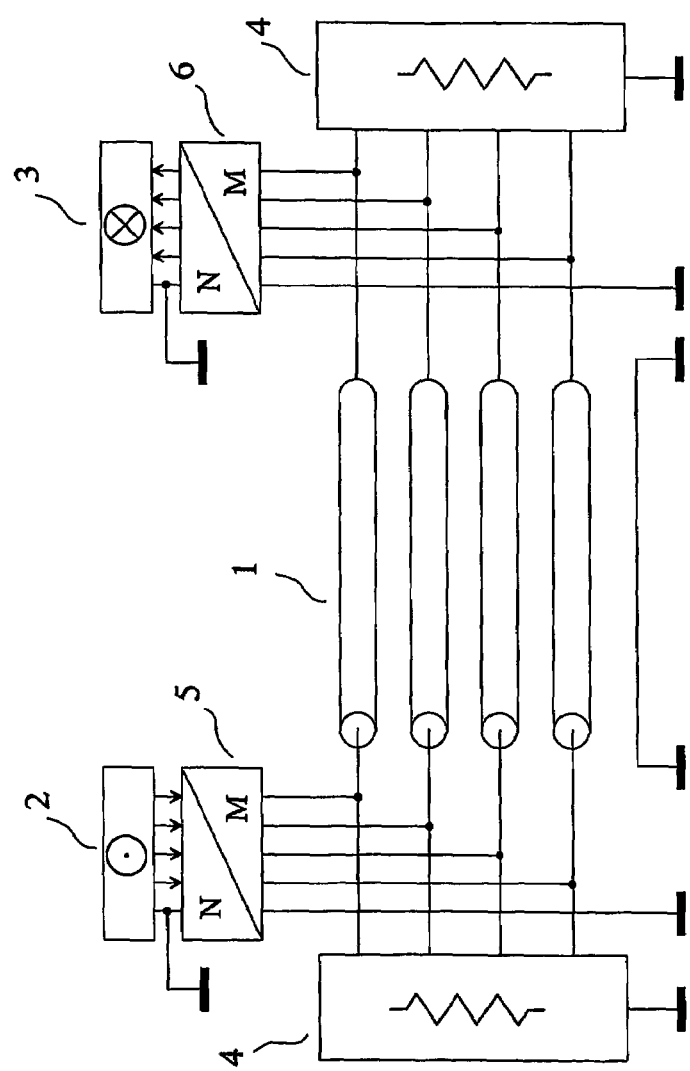
FIG. 3 shows a first embodiment of the invention.

As a first example of a device for implementing the method of the invention, given by way of non-limiting example, we have represented in FIG. 3 a device of the invention comprising an interconnection (1) having four parallel transmission conductors and a reference conductor. The transmission conductors numbered 1, 2, 3 and 4 (this numbering is not shown in FIG. 3) may be the conductors of a flat cable fitted with a screen (or shielding), this screen being used as reference conductor. In FIG. 3, the two ends of the interconnection are each connected to a termination circuit (4) presenting an impedance matrix approximating the characteristic impedance matrix in a known frequency band. The transmitting circuit (5) receives at its input the signals of the four channels of the source (2), and its four output terminals are connected to the conductors of the interconnection, this transmitting circuit producing modal voltages on these conductors, each modal voltage being proportional to the signal of a different channel. The receiving circuit (6) has its input terminals connected to the conductors of the interconnection, this receiving circuit (6) producing four signals at its output terminals connected to the destination (3), each signal being proportional to one of the modal voltages appearing on these conductors. Thus, the signals of the four channels of the source (2) are sent to the four channels of the destination (3), without noticeable crosstalk.

Note that, in the device of FIG. 3, the receiving circuit (6) must be such that its connection in parallel to the termination circuit (4) does not significantly alter the values of the impedance matrix connected to the end of the line. The receiving circuit (6) must therefore present a high impedance to the interconnection (1), such that the interconnection (1) indeed sees at this end an impedance matrix nearing that of the termination circuits (4).

Note that, in the device of FIG. 3, the transmitting circuit (5) can on the contrary show any impedance to the interconnection (1), because no incident wave can reach the end of the interconnection (1) to which the transmitting circuit (5) is connected. For that very reason, the termination circuit (4) connected to the same end of the interconnection as the transmitting circuit (5) could be removed, the advantage being that the transmitting circuit (5) would see twice the initial impedance, and that it would need to deliver only half the initial power to produce a given voltage level at the receiving circuit (6).

Second Embodiment (Best mode)

Figure 4:
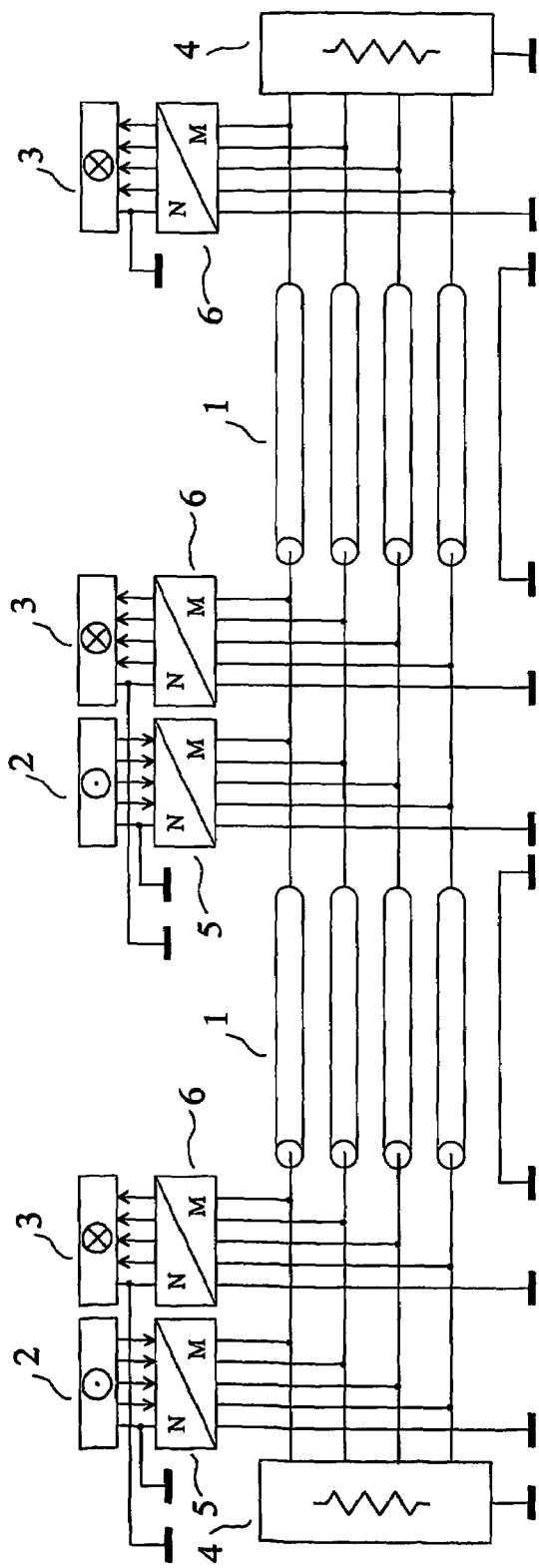
FIG. 4 shows a second embodiment of the invention (best mode)

As a second example of a device for implementing the method of the invention, given by way of non-limiting example and best mode of carrying out the invention, we have represented in FIG. 4 a device of the invention, comprising an interconnection (1) having four parallel transmission conductors, and a reference conductor. The interconnection is connected at each end to a termination circuit (4). Two transmitting circuits (5) placed at two different abscissa z, receive at their inputs the signals from the four channels of each of the two sources (2), these transmitting circuits (5) producing, when they are active, modal voltages, each being proportional to the signal of one channel. Note that this is a data bus architecture, and that the signals needed to obtain the active state of at most one transmitting circuit at a given time are not shown in FIG. 4. The three receiving circuits (6) placed at three different abscissa z, have their input terminals connected to the conductors of the interconnection, these receiving circuits (6) producing output signals being each proportional to a different modal voltage, at their output terminals connected to the destinations (3). Thus, the signals of the four channels of a source (2), connected to an active transmitting circuit (5), are sent to the four channels of the destination (3) without noticeable crosstalk.

Note that, in the device of FIG. 4, the transmitting circuits (5) and the receiving circuit (6), being connected in parallel to the interconnection (1), must present a high impedance to the interconnection (1), in order not to disturb the propagation of waves along the interconnection in a detrimental way, and in order not to produce undesirable reflections at the ends of the interconnection (1). In the device of FIG. 4, both termination circuits are necessary because waves coming from the interconnection (1) may be incident on both ends.

Third Embodiment

As a third example of a device for implementing the method of the invention, given by way of non-limiting example, we have considered the application of the method of the invention inside an integrated circuit in gallium arsenide technology, confining ourselves to discussing the creation of the termination circuit(s). A paper by J. Chilo entitled "Modélisation et analyse temporelle d'un bus d'interconnexion en technologie GaAs", published in *Annales des télécommunications, vol.* 40, No. 3–4, Mars-Avril 1985, provides the L and C matrices of such an interconnection with 8 transmission conductors:

$$L = \begin{pmatrix} 0,57 & 0,21 & 0,11 & 0,06 & 0,04 & 0,03 & 0,02 & 0,01 \\ 0,21 & 0,57 & 0,21 & 0,11 & 0,06 & 0,04 & 0,03 & 0,02 \\ 0,11 & 0,21 & 0,56 & 0,21 & 0,11 & 0,06 & 0,04 & 0,03 \\ 0,06 & 0,11 & 0,21 & 0,56 & 0,21 & 0,11 & 0,06 & 0,04 \\ 0,04 & 0,06 & 0,11 & 0,21 & 0,56 & 0,21 & 0,11 & 0,06 \\ 0,03 & 0,04 & 0,06 & 0,11 & 0,21 & 0,56 & 0,21 & 0,11 \\ 0,02 & 0,03 & 0,04 & 0,06 & 0,11 & 0,21 & 0,57 & 0,21 \\ 0,01 & 0,02 & 0,03 & 0,04 & 0,06 & 0,11 & 0,21 & 0,57 \end{pmatrix} \mu H/m$$

$$C = \begin{pmatrix} 465 & -156 & -16 & -5 & -3 & -2 & -1 & -1 \\ -156 & 523 & -150 & -14 & -4 & -2 & -1 & -1 \\ -16 & -150 & 523 & -150 & -14 & -4 & -2 & -2 \\ -5 & -14 & -150 & 523 & -150 & -14 & -4 & -3 \\ -3 & -4 & -14 & -150 & 523 & -150 & -14 & -5 \\ -2 & -2 & -4 & -14 & -150 & 523 & -150 & -16 \\ -1 & -1 & -2 & -4 & -14 & -150 & 523 & -156 \\ -1 & -1 & -2 & -3 & -5 & -16 & -156 & 465 \end{pmatrix} pF/m$$

The reference conductor of this interconnection is made of two conductive planes, which must be sufficiently interconnected, as explained above. With this data, we can use equation (7) to calculate the characteristic impedance matrix of the interconnection. We obtain:

$$Z_C = \begin{pmatrix} 37,35 & 13,31 & 6,45 & 3,36 & 2,08 & 1,44 & 0,93 & 0,51 \\ 13,31 & 37,07 & 13,19 & 6,38 & 3,32 & 2,04 & 1,40 & 0,93 \\ 6,45 & 13,19 & 36,71 & 13,18 & 6,38 & 3,32 & 2,04 & 1,44 \\ 3,36 & 6,38 & 13,18 & 36,71 & 13,18 & 6,38 & 3,32 & 2,08 \\ 2,08 & 3,32 & 6,38 & 13,18 & 36,71 & 13,18 & 6,38 & 3,36 \\ 1,44 & 2,04 & 3,32 & 6,38 & 13,18 & 36,71 & 13,19 & 6,45 \\ 0,93 & 1,40 & 2,04 & 3,32 & 6,38 & 13,19 & 37,07 & 13,31 \\ 0,51 & 0,93 & 1,44 & 2,08 & 3,36 & 6,45 & 13,31 & 37,35 \end{pmatrix} \Omega$$

Proportioning a network of resistors presenting an impedance matrix equal to $Z_C$ may be achieved with methods well known to the person skilled in the art. The matrix $Z_C$ being symmetrical, these exact methods synthesize a network comprising at least $n(n+1)/2$ resistors, that is to say 36 resistors if $n=8$.

Figure 5:
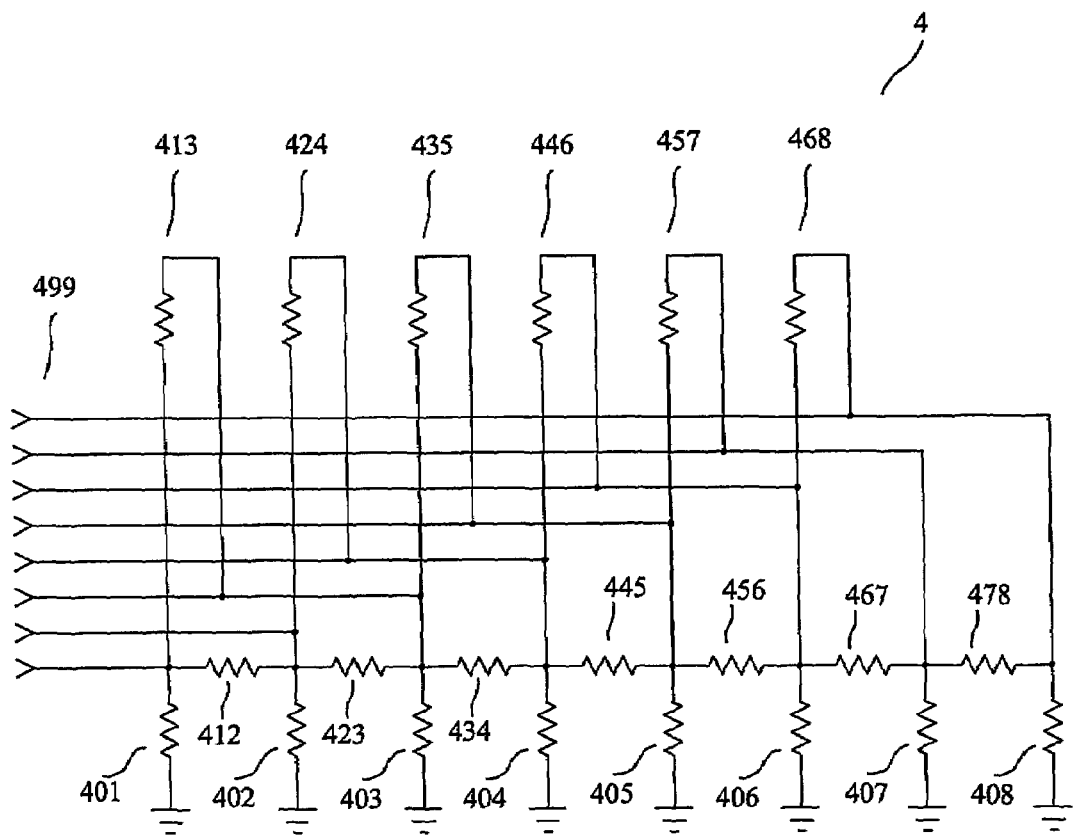
FIG. 5 shows a detail of a third embodiment of the invention.

In fact, a termination circuit comprising far fewer resistors, providing a good approximation of $Z_C$ can be defined easily. For instance, the schematic diagram of FIG. 5 illustrates such a termination circuit (4) made of 21 resistors. The input terminals (499) of this termination circuit are intended to be connected to the transmission conductors and its ground is intended to be connected to the reference conductor. The values of the grounded resistors (401), (402), (403), (404), (405), (406), (407) and (408) range from 55 Ω to 89 Ω. The values of the resistors connected between adjacent transmission conductors, that is to say the resistors (412), (423), (434), (445), (456), (467) and (478), range from 95 Ω to 100 Ω. The values of the resistors connected between transmission conductors having only a single other transmission conductor between them, that is to say the resistors (413), (424), (435), (446), (457) and (468), range from 680 Ω to 770 Ω.

This possibility of reducing the number of parts of a termination circuit is related to the fact that, for this interconnection, the couplings between distant conductors become quite weak. However, as is the case for any approximation, it should be established if it is appropriate for a given performance objective.

Fourth Embodiment

Figure 6:
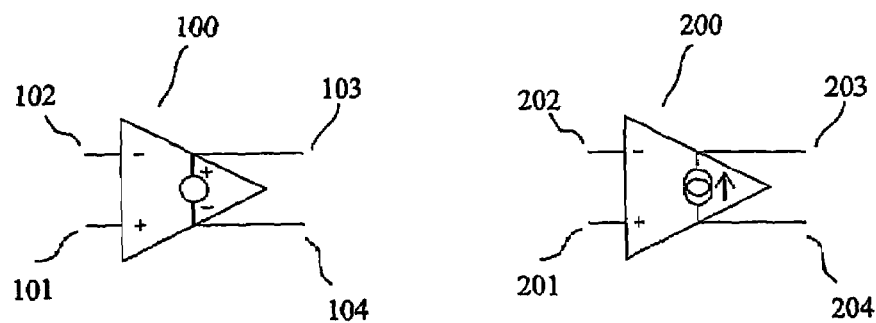
FIG. 6 shows the symbols used in FIGS. 7 to 10.

Before going into the details of a fourth device of the invention, it is useful to refer to FIG. 6, in which we have represented two symbols used in the figures that follow after, namely the symbol of the voltage controlled voltage source (100) and the symbol of the voltage controlled current source (200).

The voltage controlled voltage source (100) is an ideal circuit element well known to the person skilled in the art, implemented in the SPICE simulation software of the University of California at Berkeley. This ideal circuit element is characterized by its gain. The potential difference between the positive output terminal (103) and the negative output terminal (104) is equal to the gain multiplied by the potential difference between the positive input terminal (101) and the negative input terminal (102).

The voltage controlled current source (200) is also an ideal circuit element well known to the person skilled in the art, implemented in the SPICE simulation software. This ideal circuit element is characterized by its transconductance. The current leaving its positive output terminal (203) is equal to the current entering its negative output terminal (204) and is equal to the transconductance multiplied by the potential difference between its positive input terminal (201) and its negative input terminal (202).

The person skilled in the art knows how to create circuits having a behavior very similar to that of the voltage controlled voltage source (100) or the voltage controlled current source (200). There are many possible schematic diagrams, depending mainly on the desired accuracy and on the operating frequency band. Note that the outputs of the voltage controlled voltage source and of the voltage controlled current source are floating outputs. If an ideal circuit element is used with one of its outputs grounded, it is obviously not necessary to plan for a circuit providing the ideal circuit element function to have floating outputs. Otherwise, this characteristic may be obtained for instance by using the concept of floating operational amplifier described in the paper "Operational floating amplifier" by J. H. Huijsing, published in the journal IEE Proceedings, Vol. 137, Pt. G, No. 2, April 1990.

Figure 7:
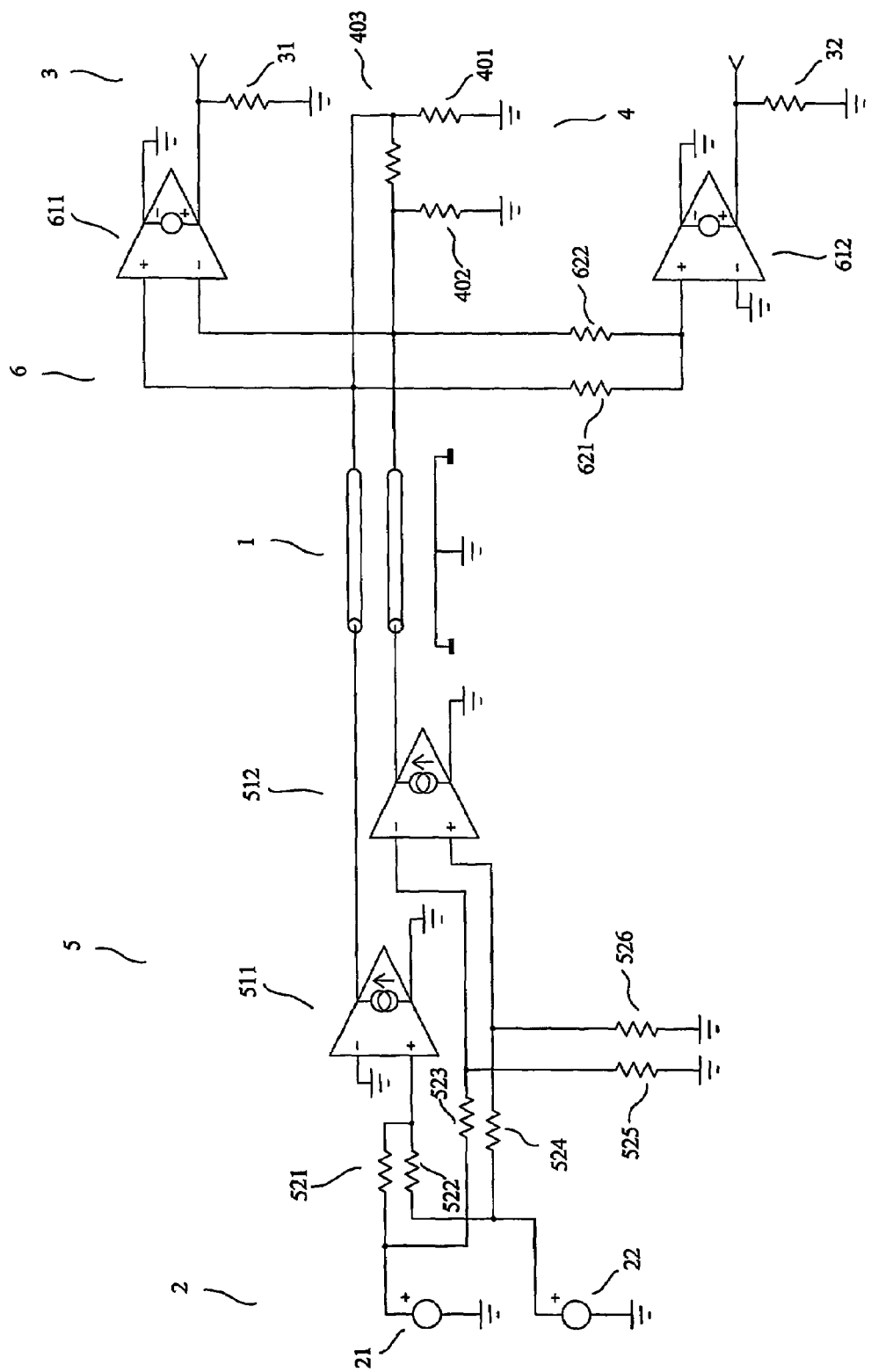
FIG. 7 shows a fourth embodiment of the invention.

Important aspects of the invention will appear more clearly from the following description of a fourth embodiment, given by way of non-limiting example, and shown in the schematic diagram in FIG. 7. This device comprises a 30 cm long interconnection (1) having two parallel transmission conductors and a reference conductor. For this particular interconnection, the matrices L and C are $$L = \begin{pmatrix} 0,8629 & 0,3725 \\ 0,3725 & 0,8629 \end{pmatrix} \mu H/m$$

$$C = \begin{pmatrix} 46,762 & -18,036 \\ -18,036 & 46,762 \end{pmatrix} pF/m$$

and the losses are negligible. We may determine the matrices $Z_C$, S and T as explained above, and we obtain for instance:

$$Z_C = \begin{pmatrix} 147,187 & 60,1923 \\ 60,1923 & 147,187 \end{pmatrix} \Omega$$

$$S = \begin{pmatrix} 1,0912 & 2,4616 \\ -1,0912 & 2,4616 \end{pmatrix}$$

$$T = \begin{pmatrix} 0,70711 & 0,70711 \\ -0,70711 & 0,70711 \end{pmatrix}$$

In the last two expressions, the matrices S and T are associated, with the value of the arbitrary per-unit-length capacitance $c_K$ defined by equation (5) equal to $10^{-10}$ F/m.

In FIG. 7, only one end of the interconnection (1) is connected to a termination circuit (4) made of three resistors (401), (402) and (403), the value of the resistors (401) and (402) being 207 Ω, and the value of the resistor (403) being 300 Ω, as these values produce an impedance matrix very close to $Z_C$. The transmitting circuit (5) comprises two voltage controlled current sources (511) and (512) and six resistors (521), (522), (523), (524), (525) and (526). This transmitting circuit receives at its input the signal of the two channels of the source (2), represented by the voltage sources (21) and (22). The receiving circuit (6) comprises two voltage controlled voltage sources (611) and (612) and two resistors (621) and (622). These two resistors must not prevent the interconnection from seeing a termination showing an impedance matrix approximating the characteristic impedance matrix. As a consequence, the two resistors (621), (622) must each have a much greater value than the value of the resistor (403) and/or the receiving circuit must be considered as having a part in common with the termination circuit, which modifies the value of the resistor (403) in such a way that this resistor in parallel with the resistors (621) and (622) in series together provide the desired value of 300 Ω.

This schematic diagram and the proportioning of the circuit elements can be directly inferred from the theory presented above. For instance, the values of the resistors of the transmitting circuit and of the receiving circuit, the transconductance of the two voltage controlled current sources and the gain of the two voltage controlled voltage sources, may be inferred from the equations (16) and (22), upon choosing the proportionality coefficients $\alpha_i$ and $\beta_i$ suited to the amplitudes that the designer wishes on the interconnection.

With such proportioning, the transmitting circuit (5) would produce two modal voltages, each being proportional to the signal produced by one of the voltage sources (21) and (22), and the receiving circuit (6) would produce on the two output channels connected to the destination (3) represented by the resistors (31) and (32), two signals being each proportional to a modal voltage. The signals of the two source (2) channels are sent to the two destination (3) channels, and a computation shows that there is no noticeable crosstalk. Of course, the proportioning of the transmitting circuit (5), the receiving circuit (6) and the termination circuit (4) does not depend on the length of the interconnection.

The person skilled in the art knows how to build devices whose working is fairly close to the schematic diagram of FIG. 7. For instance, a device comprising a transmitting circuit and a receiving circuit, capable of operating in the frequency band of 100 kHz to 100 MHz, may implement fast operational amplifiers and current mirrors as active circuit elements, and include no inductive circuit element. The absence of an inductive circuit element, and in particular of a transformer, allows for an easy integration of such a circuit, for instance using a single integrated circuit for the transmitting circuit (5) and a single integrated circuit for the receiving circuit (6) and the termination circuit (4).

It is interesting to note that this very example of interconnection was discussed by C. R. Paul in his paper "Solution of the Transmission-Line Equation Under the Weak-Coupling Assumption", published in the journal *IEEE Transactions on Electromagnetic Compatibility*, vol. 44, No. 3, August 2002, pages 413 to 423. Note that, in accordance with the prior art presented above, he calls "matched termination" a termination made of just 135.8 Ω grounded resistors, and that with these resistors, he computes significant crosstalk shown in his FIG. 6. In this paper, he observes that grounded resistors cannot be considered as truly matched terminations, and he refers to his book cited above, in which he explains in paragraph 5.2.6.1 that truly matched terminations unavoidably produce high crosstalk. The theoretical contribution of the invention is clearer now: it proves that, contrary to prior beliefs, with truly matched terminations such as the termination circuits of the invention, provided that they are used in a suitable context, that is to say with transmitting circuits and receiving circuits of the invention, we can practically eliminate crosstalk.

Fifth Embodiment

Figure 8:
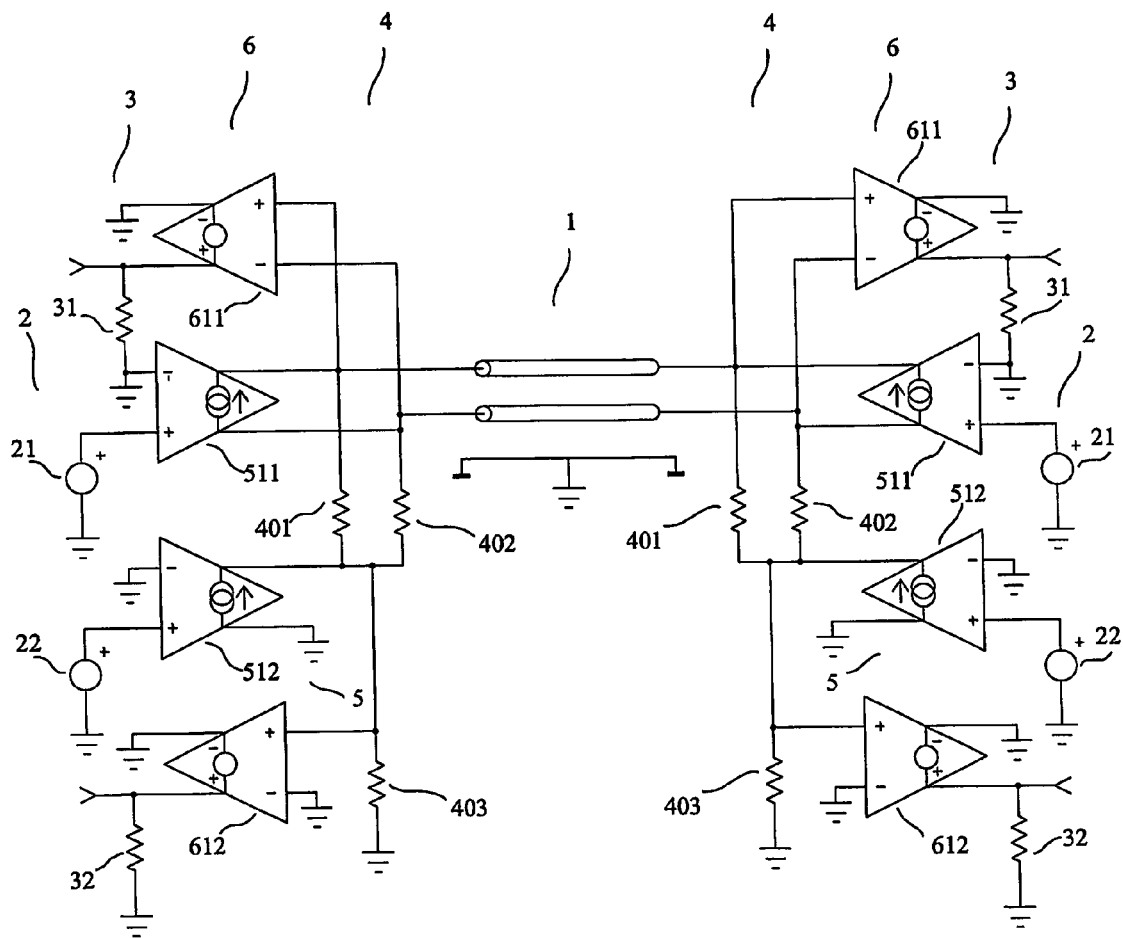
FIG. 8 shows a fifth embodiment of the invention.

Other aspects of the invention may become more apparent from the following description of a fifth embodiment, given by way of non-limiting example, and shown in the schematic diagram in FIG. 8. This device comprises an interconnection (1) having two transmission conductors, identical to the one used in the fourth embodiment of the invention.

In FIG. 8, the two ends of the interconnection (1) are each connected to a termination circuit (4) made of three resistors (401), (402) and (403), the value of the resistors (401) and (402) being 87 Ω and the value of the resistors (403) being 60,2 Ω, because these values indeed produce an impedance matrix very close to $Z_C$. Each of the two transmitting circuits (5) has parts in common with a termination circuit (4) and comprises only the voltage controlled current sources (511) and (512) as its own circuit elements. These transmitting circuits (5) receive at their input the signals of the two channels of the two sources (2), each represented by the voltage sources (21) and (22). These transmitting circuits indeed produce modal voltages such that each of them is proportional to the signal of one of the voltage sources (21) or (22). It is therefore essential that only one of the two sources (2) be active at any given time.

The two receiving circuits (6) have parts in common with each of the termination circuits (4) and comprise only the voltage controlled voltage sources (611) and (612) as their own circuit elements. These receiving circuits indeed produce, on their two output channels connected to the destinations (3) each represented by the resistors (31) and (32), two signals being each proportional to a modal voltage. The signals of the two channels of an active source (2) are sent to the two channels of the two destinations (3), and a computation shows that there is no noticeable crosstalk.

It is interesting to compare this embodiment to the previous one, because we can see that devices of the invention comprising the same interconnection may have quite different schematic diagrams. In particular, note that, in the device in FIG. 7, the termination circuit (4), the transmitting circuit (5) and the receiving circuit (6) are all separate, whereas, in the device in FIG. 8, the termination circuits (4), the transmitting circuits (5) and the receiving circuits (6) have parts in common, which allows for a particularly small number of circuit elements. The person skilled in the art will also note that the simplicity of schematic diagram in FIG. 8 is related to the fact that the interconnection is balanced, as observed when examining the matrices L and C.

Sixth Embodiment

Figure 9:
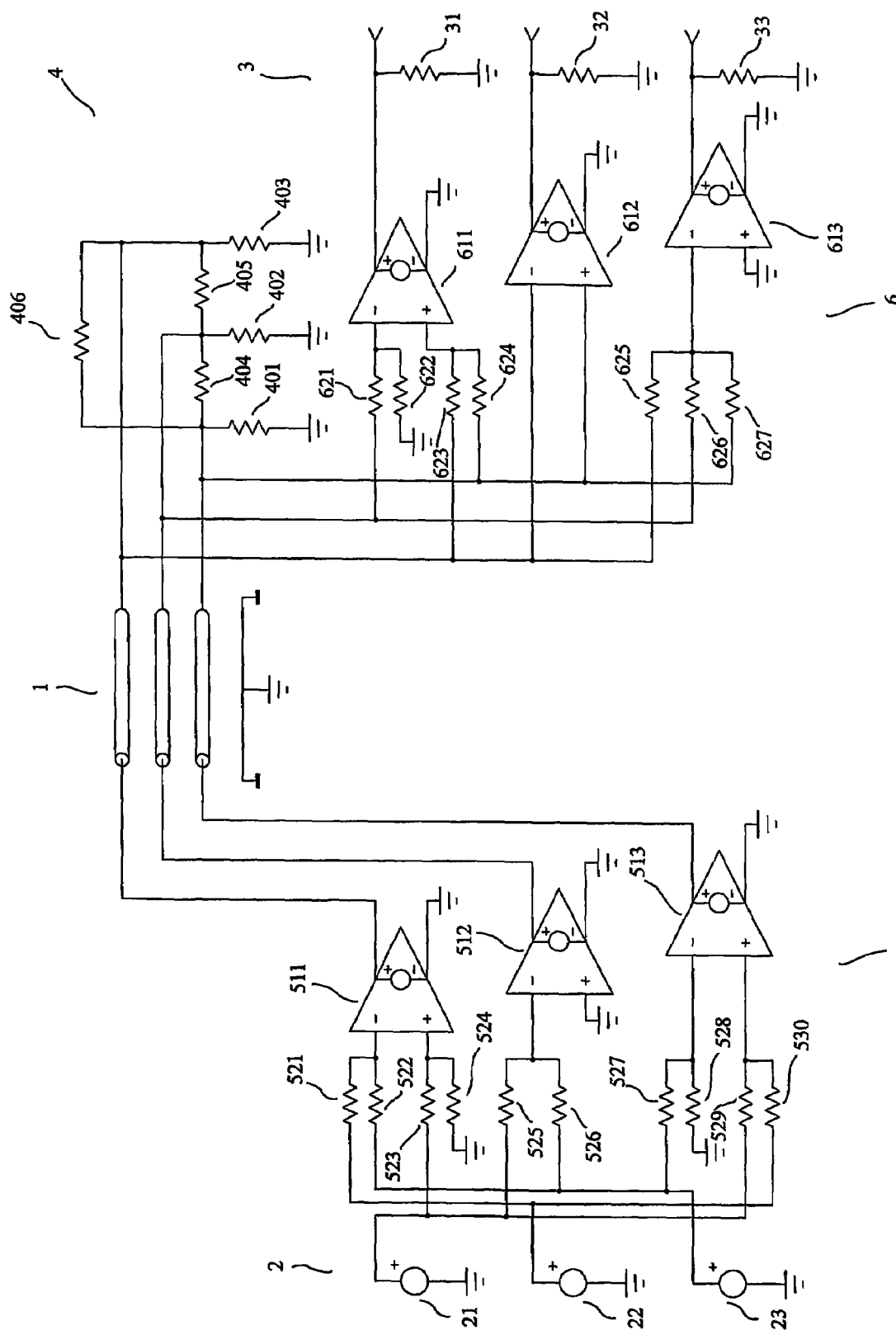
FIG. 9 shows a sixth embodiment of the invention.

Other aspects of the invention may appear more clearly from the following description of a sixth embodiment, given by way of non-limiting example, and shown in the schematic diagram in FIG. 9. This device comprises an interconnection (1) having three parallel transmission conductors and one reference conductor, 40 cm in length. For this particular interconnection, the matrices L and C are $$L = \begin{pmatrix} 0,3139 & 0,0675 & 0,0222 \\ 0,0675 & 0,3193 & 0,0675 \\ 0,0222 & 0,0675 & 0,3139 \end{pmatrix} \mu H/m$$

$$C = \begin{pmatrix} 130,3 & -16,2 & -0,8 \\ -16,2 & 133,7 & -16,2 \\ -0,8 & -16,2 & 130,3 \end{pmatrix} pF/m$$

and the losses will be assumed negligible. An interconnection with these parameters has been discussed by J. G. Nickel, D. Trainor and J. E. Schutt-Ainé in their paper "Frequency-Domain-Coupled Microstrip-Line Normal-Mode Parameter Extraction From S-Parameters", published in the journal *IEEE Transactions on Electromagnetic Compatibility*, vol. 43, No. 4, November 2001, pages 495 to 503. We may determine the matrices $Z_C$, S and T as explained above, and we obtain for instance:

$$Z_C = \begin{pmatrix} 49,41 & 8,35 & 2,24 \\ 8,35 & 49,53 & 8,35 \\ 2,24 & 8,35 & 49,41 \end{pmatrix} \Omega$$

$$S = \begin{pmatrix} 0,3101 & -0,5394 & -0,4793 \\ -0,4755 & 0 & -0,6232 \\ 0,3101 & 0,5394 & -0,4793 \end{pmatrix}$$

$$T = \begin{pmatrix} 0,4786 & -0,7071 & 0,5198 \\ -0,7361 & 0 & 0,6780 \\ 0,4786 & 0,7071 & 0,5198 \end{pmatrix}$$

In the last two expressions, the matrices S and T are associated, with the value of the arbitrary per-unit-length capacitance $c_K$ defined by equation (5) equal to $10^{-10}$ F/m.

In FIG. 9, only one end of the interconnection (1) is connected to a termination circuit (4) made of six resistors (401), (402), (403), (404), (405) and (406), the value of the resistors (401) and (403) being 58,7 Ω, the value of the resistor (402) being 69,2 Ω, the value of the resistors (404) and (405) being 289,5 Ω and the value of the resistor (406) being 2781 Ω, because these values produce an impedance matrix very close to $Z_C$. The transmitting circuit (5) comprises three voltage controlled voltage sources (511), (512) and (513) and ten resistors (521), (522), (523), (524), (525), (526), (527), (528), (529) and (530). This transmitting circuit receives a input the signal of the three channels of the source (2), represented by the voltage sources (21), (22) and (23). The receiving circuit (6) comprises three voltage controlled voltage sources (611), (612) and (613) and seven resistors (621), (622), (623), (624), (625), (626) and (627). These seven resistors must not prevent the interconnection from seeing a termination presenting an impedance matrix near the characteristic impedance matrix. These resistors must therefore have sufficiently large values and/or the receiving circuit must be considered as having a part in common with the termination circuit, which would modify the values defined above for the six resistors (401), (402), (403), (404), (405) and (406) in such a way that the interconnection (1) indeed sees its end connected to a network having an impedance matrix approximating its characteristic impedance matrix.

This schematic diagram and the proportioning of the circuit elements can be directly inferred from the theory presented above. For instance, the values of the resistors of the transmitting circuit and of the receiving circuit, and the gain of the six voltage controlled voltage sources, maybe inferred from the equations (14) and (16), upon choosing the proportionality coefficients $\alpha_i$ and $\beta_i$ suited to the amplitudes that the designer wishes to obtain on the interconnection.

With such proportioning, the transmitting circuit (5) would produce three modal voltages, each being proportional to the signal on one of the input channels, and the receiving circuit (6) would produce on the three output channels connected to the destination (3) represented by the resistors (31), (32) and (33), three signals being each proportional to a different modal voltage. The signals of the three channels of the source (2) are sent to the three channels of the destination (3), and a computation shows that there is no noticeable crosstalk Seventh Embodiment Other aspects of the invention may appear more clearly from the following description of a seventh embodiment, given by way of non-limiting example, and shown on the schematic diagram in FIG. 10. This device comprises an interconnection (1) having four conductors, identical to the one used in the sixth embodiment.

Figure 10:
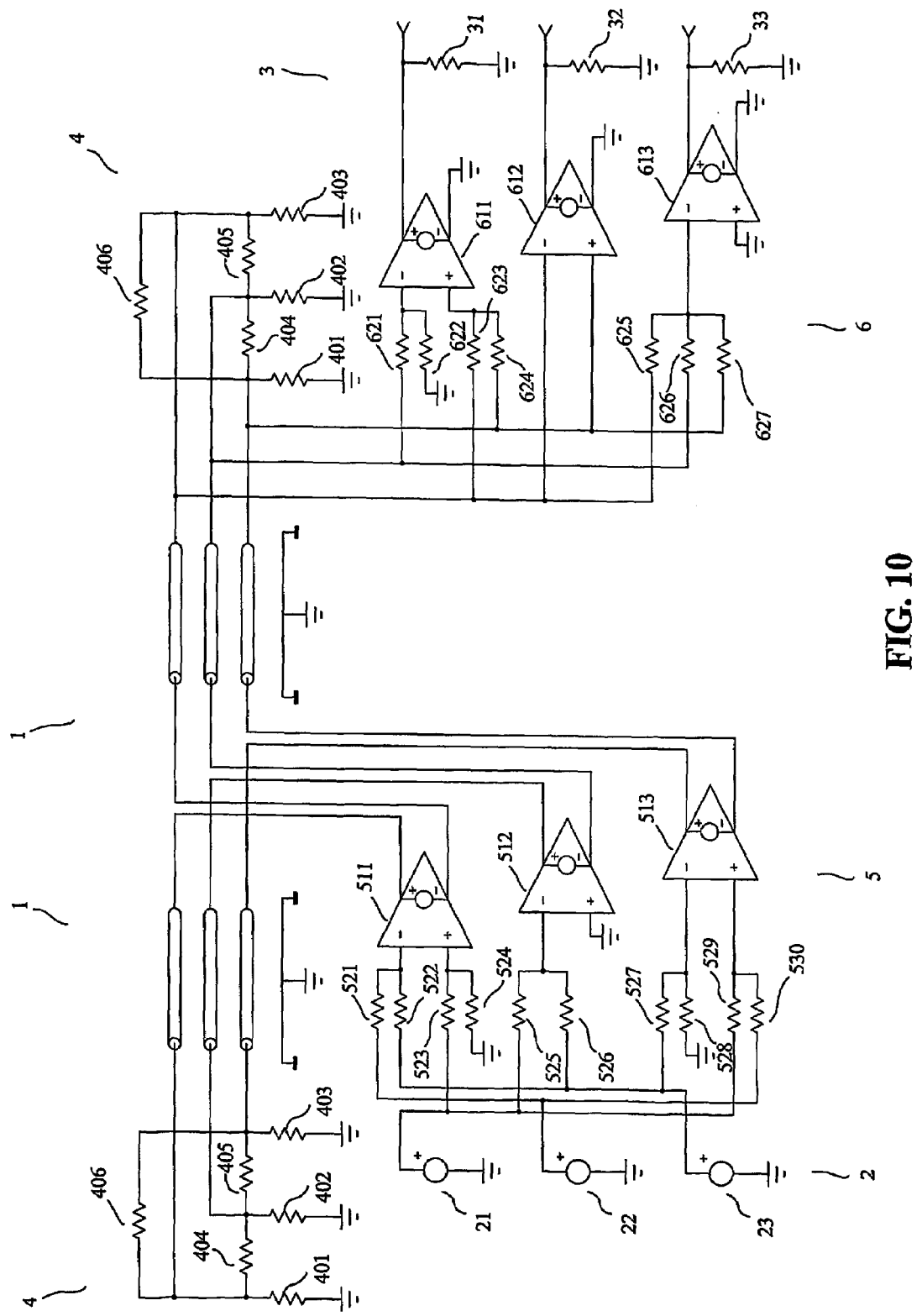
FIG. 10 shows a seventh embodiment of the invention.

As in the second embodiment represented in FIG. 4, we can see in FIG. 10 a transmitting circuit (5) that is not at one end of the interconnection. As explained above, this situation requires the use of a termination circuit (4) at both ends of the interconnection. We also note that, contrary to the other embodiments presented above, in FIG. 10 the transmitting circuit (5) is connected in series with the conductors of the interconnection (1).

In FIG. 10, the two ends of the interconnection (1) are each connected to a termination circuit (4) made of six resistors (401), (402), (403), (404), (405) and (406), having the same values as in the sixth embodiment. The transmitting circuit (5) comprises three voltage controlled voltage sources (511), (512) and (513) and ten resistors (521), (522), (523), (524), (525), (526), (527), (528), (529) and (530). This transmitting circuit receives at its input the signal of the three channels of the source (2), represented by the voltage sources (21), (22) and (23). The receiving circuit (6) comprises three voltage controlled voltage sources (611), (612) and (613) and seven resistors (621), (622), (623), (624), (625), (626) and (627). As explained for the sixth embodiment, these seven resistors must not prevent the interconnection from seeing a termination showing an impedance matrix near the characteristic impedance matrix.

This schematic diagram and the proportioning of the circuit elements can be directly inferred from the theory presented above. The values of the resistors of the transmitting circuit and of the receiving circuit, and the gain of the six voltage controlled voltage sources, may be the same as for the sixth embodiment. However, the person skilled in the art notes that, if we want the sixth and the seventh embodiment to deliver the same amplitude to the interconnection (1) and to the destination (3) for given signals coming from the three source (2) channels, the gains of the three voltage controlled voltage sources (511), (512) and (513) of the transmitting circuit (5) must be, in the circuit of FIG. 10, twice as large as the corresponding gains used in the circuit of FIG. 9.

Here again, it can be proved, for instance with a simulation, that with such proportioning, the signals of the three source (2) channels are sent to the three destination (3) channels, without noticeable crosstalk.

INDICATIONS ON INDUSTRIAL APPLICATIONS

According to the invention, it is possible to built into one or several items intended to be interconnected, for instance integrated circuits, a said transmitting circuit and/or a said receiving circuit, to be used for interconnections having predetermined characteristics, for instance a required drawing of the section of the interconnection orthogonal to the direction of propagation, for an implementation on an external layer of a printed circuit board using a substrate of epoxy-bonded fiberglass of specified permittivity. If such an item is used, we could obtain a device for implementing the method of the invention, wherein one or more items to be interconnected contain a transmitting circuit and/or a receiving circuit, intended for interconnections with predetermined characteristics. The designer integrating such items need only create an interconnection of any length and of said predetermined characteristics, and the termination circuits, in order to obtain a device of the invention. It is clear that this approach would be interesting for instance for items intended to be connected to a data bus, e.g. microprocessors or memories, or for instance for circuit boards intended to be connected to a backplane comprising the conductors of the interconnection.

According to the invention, it is possible to built into one or several items intended to be interconnected, for instance integrated circuits, a said transmitting circuit and/or a said receiving circuit, designed for interconnections having predetermined characteristics, and also to build into these items a termination circuit designed for interconnections having the same said predetermined characteristics. The designer integrating such items need only create an interconnections having the predetermined characteristics, to obtain a device of the invention.

According to the invention, with a reference conductor and a multiconductor transmission line having n transmission conductors, m transmission channels are created, which allow the transmission of m signals. The number m is less than or equal to a n, but for a given integer n, it is always possible to design a device of the invention such that m=n.

For a specified number m of channels, it would seem unwise to choose a value of n that is greater than m. But we now see that this circumstance is likely to occur if we wish to use a standard interconnection having a fixed number of transmission conductors.

The invention is particularly suitable for cases where the transmission channels are used to send digital signals. In fact, in this case, a residual crosstalk coupling factor is acceptable, but the bandwidth to take into account is often very wide. According to the invention, this result is easily obtained in an inexpensive way, because it is compatible with the use of resistors of average accuracy.

As shown with the second embodiment, the invention is appropriate for an implementation wherein the interconnection is operated as a data bus.

The invention is particularly suitable for its implementation with microstrip structures and stripline structures, for instance on printed circuit boards. It is particularly beneficial to printed circuit boards comprising a wide band analog circuitry or fast digital circuits. Its implementation on printed circuit boards would for instance free designers of digital circuits from the limitations as to the length of traces which they up to now had to observe.

The invention is therefore applicable when manufacturing computers, which include a large number of long interconnections for very fast signals.

The invention is also particularly suitable for reducing crosstalk in flat multiconductor cables and inside integrated circuits.

The invention claimed is:

1. A method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the method comprising the steps of:

modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

determining, for the multiconductor transmission line and the known frequency band, the characteristic impedance matrix and a transition matrix from modal electrical variables to natural electrical variables;

placing at least one end of the interconnection, a termination circuit having an impedance matrix approximating the characteristic impedance matrix;

combining the m input signals in one of the transmitting circuits without using a transformer for this purpose, according to linear combinations defined by the transition matrix from modal electrical variables to natural electrical variables, so as to obtain at the output of said one of the transmitting circuits, output being connected to the n transmission conductors, the generation of modal electrical variables, each being proportional to a single signal among the input signals; and combining in one of the receiving circuits, the input of which is connected to the n transmission conductors, without using a transformer for this purpose, the signals present on the transmission conductors, according to linear combinations defined by the inverse of the transition matrix from modal electrical variables to natural electrical variables, so as to obtain at the output of said one of the receiving circuits m output signals each corresponding to one of the transmission channels, each output signal being proportional to a single modal electrical variable among the modal electrical variables.

2. The method of claim 1, wherein the generation of m modal electrical variables is obtained at the output of a transmitting circuit.

3. The method of claim 1, wherein the number m of transmission channels between any one of the transmitting circuits and any one of the receiving circuits is equal to the number n of transmission conductors.

4. The method of claim 1, wherein the electrical variables are either all voltages or all currents.

5. The method of claim 1, wherein the section of the interconnection in a plan orthogonal to the direction of propagation does not change, except for a scale factor, over the greatest part of the length of the interconnection, in the vicinity of the transmission conductors.

6. The method of claim 1, wherein n is greater than or equal to three.

7. The method of claim 1, wherein the known frequency band contains frequencies ranging from 100 kHz to 100 GHz.

8. A device for proportioning the circuits used in a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the device comprising:
  means for modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;
  means for determining, for the multiconductor transmission line and the known frequency band, the characteristic impedance matrix and a transition matrix from modal electrical variables to natural electrical variables;
  means for proportioning a termination circuit having an impedance matrix approximating the characteristic impedance matrix;
  means for proportioning one of the transmitting circuits which combines the m input signals, without using a transformer for this purpose, according to linear combinations defined by the transition matrix from modal electrical variables to natural electrical variables, so as to obtain at the output of said one of the transmitting circuits, output being connected to the n transmission conductors, the generation of modal electrical variables, each being proportional to a single signal among the input signals; and
  means for proportioning one of the receiving circuits, the input of which is connected to the n transmission conductors, which combines, without using a transformer for this purpose, the signals present on the transmission conductors according to linear combinations defined by the inverse of the transition matrix from modal electrical variables to natural electrical variables, so as to obtain at the output of said one of the receiving circuits m output signals each corresponding to one of the transmission channels, each output signal being proportional to a single modal electrical variable among the modal electrical variables.

9. The device of claim 8 wherein the means for modeling the interconnection comprise means for measuring and/or for computing the real electrical characteristics of the interconnection, based on the relative layout of the transmission conductors and the reference conductor, and on the characteristics of the dielectrics surrounding them.

10. The device of claim 8, wherein the means for modeling the interconnection comprise:
  means for calculating one or more error coefficients for variance between the actual electrical characteristics of the interconnection and the desired characteristics, for the known frequency band; and
  means for optimizing the relative position of the transmission conductors by minimizing the error coefficients or coefficients.

11. A device for transmission providing, in a known frequency band, m transmission channels each corresponding to a signal to be sent from the input of at least one transmitting circuit to the output of at least one receiving circuit, where m is an integer greater than or equal to 2, the device comprising:
  an interconnection with n transmission conductors and a reference conductor, n being an integer greater than or equal to m, the interconnection being proportioned in such a way that the interconnection may, taking into account the lumped impedances seen by the interconnection and caused by the circuits connected to the interconnection elsewhere than at the ends of the interconnection, be modeled as a multiconductor transmission line having uniform electrical characteristics over its length for the known frequency band;
  one or two termination circuits, each arranged at one end of the interconnection and each having, in the known frequency band, an impedance matrix approximating the characteristic impedance matrix of the multiconductor transmission line, the termination circuits, if there are several termination circuits, being each arranged at a different end of the interconnection;
  at least one of the transmitting circuits for combining the m input signals, without using a transformer for this purpose, according to linear combinations defined by a transition matrix from modal electrical variables to natural electrical variables, in order to obtain at the output of said one of the transmitting circuits, output being connected to the n transmission conductors, the generation of modal electrical variables, each being proportional to a single signal among the input signals; and
  at least one of the receiving circuits, the input of which is connected to the n transmission conductors for combining, without using a transformer for this purpose, the signals present on the transmission conductors, according to linear combinations defined by the inverse of the transition matrix from modal electrical variables to natural electrical variables, so as to obtain at the output of said one of the receiving circuits m output signals each corresponding to one of the transmission channels, each output signal being proportional to a single modal electrical variable among the modal electrical variables.

12. The device of claim 11 where the generation of m modal electrical variables is obtained at the output of a transmitting circuit.

13. The device of claim 11, wherein the number m of transmission channels between any one of the transmitting circuits and any one of the receiving circuits is equal to the number n transmission conductors.

14. The device of claim 11, wherein the section of the interconnection in a plan orthogonal to the direction of propagation does not change, except for a scale factor, over the greatest part of the length of the interconnection, in the vicinity of the transmission conductors.

15. The device of claim 11, wherein n is greater than or equal to three.

16. The device of claim 11, wherein the termination circuit(s) is(are) made of a network of resistors.

17. The device of claim 11, wherein the transmitting circuit(s) and the receiving circuit(s) are connected in parallel to the interconnection, and wherein the interconnection sees a high impedance in the connections of the transmitting circuit(s) and the receiving circuit(s).

18. The device of claim 11, wherein one or more items to be interconnected contains a transmitting circuit and/or a -receiving circuit, intended for interconnections with predetermined characteristics.

19. The device of claim 11, wherein the transmission channels are used to send digital signals.

20. The device of claim 19, wherein the interconnection is operated as a data bus.

* * * * *